(12) United States Patent
Hosaka et al.

(10) Patent No.: US 11,947,201 B2
(45) Date of Patent: Apr. 2, 2024

(54) LIQUID CRYSTAL DEVICE, DISPLAY DEVICE, OPTICAL MODULATION MODULE, AND CONTROL METHOD OF LIQUID CRYSTAL DEVICE

(71) Applicant: SEIKO EPSON CORPORATION, Tokyo (JP)

(72) Inventors: Hiroyuki Hosaka, Matsumoto (JP); Akihide Haruyama, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/173,910

(22) Filed: Feb. 24, 2023

(65) Prior Publication Data

US 2023/0273466 A1    Aug. 31, 2023

(30) Foreign Application Priority Data

Feb. 25, 2022    (JP) ................................ 2022-027692

(51) Int. Cl.
| | | |
|---|---|---|
| *G02F 1/1335* | (2006.01) | |
| *G02F 1/01* | (2006.01) | |
| *G02F 1/133* | (2006.01) | |
| *G02F 1/13363* | (2006.01) | |
| *G02F 1/1347* | (2006.01) | |

(52) U.S. Cl.
CPC ........ *G02F 1/0136* (2013.01); *G02F 1/13306* (2013.01); *G02F 1/133528* (2013.01); *G02F 1/13363* (2013.01); *G02F 1/1347* (2013.01)

(58) Field of Classification Search
CPC ............... G02F 1/0136; G02F 1/13306; G02F 1/133528; G02F 1/13363; G02F 1/1347; G02F 1/1323; G02F 1/133601
See application file for complete search history.

(56) References Cited

U.S. PATENT DOCUMENTS

2023/0127094 A1\*   4/2023   Chen ................... G02F 1/13471
                                                        349/96

FOREIGN PATENT DOCUMENTS

| | | | |
|---|---|---|---|
| JP | 2001-142091 A | 5/2001 | |
| JP | 2004-032207 A | 1/2004 | |
| JP | 2012-252206 A | 12/2012 | |
| JP | 2013-157778 A | 8/2013 | |

\* cited by examiner

*Primary Examiner* — James A Dudek
(74) *Attorney, Agent, or Firm* — Oliff PLC

(57) ABSTRACT

A liquid crystal device includes a liquid crystal panel including a liquid crystal layer as a first liquid crystal layer, a first polarizing element, a second polarizing element, a first phase difference adjusting element arranged between the first polarizing element and the liquid crystal panel and including a liquid crystal layer as a second liquid crystal layer, a second phase difference adjusting element arranged between the liquid crystal panel and the second polarizing element and including a liquid crystal layer as a third liquid crystal layer, and a first phase difference controlling element driving unit and a second phase difference controlling element driving unit as control units configured to control a value of a voltage applied to the first phase difference adjusting element and the second phase difference adjusting element, based on image data input to the liquid crystal panel.

8 Claims, 13 Drawing Sheets

LIQUID CRYSTAL DEVICE, DISPLAY DEVICE, OPTICAL MODULATION MODULE, AND CONTROL METHOD OF LIQUID CRYSTAL DEVICE

The present application is based on, and claims priority from JP Application Serial Number 2022-027692, filed Feb. 25, 2022, the disclosure of which is hereby incorporated by reference herein in its entirety.

BACKGROUND

1. Technical Field

The present disclosure relates to a liquid crystal device, a display device, an optical modulation module, and a control method of a liquid crystal device.

2. Related Art

When, on a display screen of a liquid crystal panel, for example, a white pixel and a black pixel are adjacent to each other at a boundary between a character and a background, a high potential is applied to a pixel electrode of the white pixel whereas a low potential is applied to a pixel electrode of the black pixel, which may generate a reverse tilt domain where liquid crystal molecules are aligned in a direction different from an original alignment direction due to a horizontal electric field between the pixel electrode of the white pixel and the pixel electrode of the black pixel.

It is known that generation of a reverse tilt domain on the liquid crystal panel causes degradation of display quality. In particular, a horizontal electric field has a larger influence on a small-sized and high-resolution liquid crystal panel, and hence suppression of a reverse tilt domain is one of the problems to be solved.

As a technique of suppressing generation of a reverse tilt domain as described above, JP-A-2012-252206 discloses a technique of weakening a horizontal electric field by correcting tone data so as to reduce a difference between voltages applied to pixels.

However, when tone data is corrected so as to weaken a horizontal electric field, a change of a display content depending on this correction is more likely to be visually recognized by a viewer as, for example, a blurry image, which may cause another problem, that is, occurrence of display contradiction.

An advantage of some aspects of the present disclosure is to suppress degradation of display quality due to a reverse tilt domain.

SUMMARY

According to an aspect of the present application, a liquid crystal device includes a liquid crystal panel including a first liquid crystal layer, a first polarizing element provided on a light incidence side of the liquid crystal panel, a second polarizing element provided on a light emission side of the liquid crystal panel, a first phase difference adjusting element arranged between the first polarizing element and the liquid crystal panel and including a second liquid crystal layer, a second phase difference adjusting element arranged between the liquid crystal panel and the second polarizing element and including a third liquid crystal layer, and a control unit configured to control a voltage applied to the first phase difference adjusting element and the second phase difference adjusting element in accordance with an image displayed by the liquid crystal panel.

According to an aspect of the present application, a liquid crystal device includes a first phase difference adjusting element that is arranged between the first polarizing element and the liquid crystal panel including a first liquid crystal layer and that includes a second liquid crystal layer, the first phase difference adjusting element being configured to change an alignment direction of liquid crystal molecules of the second liquid crystal layer, based on a first signal, and a second phase difference adjusting element arranged between the liquid crystal panel and the second polarizing element and including a third liquid crystal layer, the second phase difference adjusting element being configured to change an alignment direction of liquid crystal molecules of the third liquid crystal layer, based on a second signal.

According to an aspect of the present application, a liquid crystal device includes a first phase difference adjusting element that is arranged between the first polarizing element and the liquid crystal panel including a first liquid crystal layer and that includes a second liquid crystal layer on which linearly polarized light is incident and a first driving unit configured to control a phase difference of the second liquid crystal layer so as to emit linearly polarized light or circularly polarized light from the second liquid crystal layer, and a second phase difference adjusting element that is arranged between the liquid crystal panel and the second polarizing element and that includes a third liquid crystal layer on which linearly polarized light or circularly polarized light is incident and a second driving unit configured to control a phase difference of the third liquid crystal layer so as to emit linearly polarized light from the third liquid crystal layer.

According to an aspect of the present application, a display device includes the liquid crystal device described above.

According to an aspect of the present application, an optical modulation module includes a liquid crystal panel including a first liquid crystal layer, a first polarizing element provided on a light incidence side of the liquid crystal panel, a second polarizing element provided on a light emission side of the liquid crystal panel, a first phase difference adjusting element to which a voltage is applied in accordance with an image displayed by the liquid crystal panel, the first phase difference adjusting element being arranged between the first polarizing element and the liquid crystal panel and including a second liquid crystal layer, and a second phase difference adjusting element to which a voltage is applied in accordance with the image displayed by the liquid crystal panel, the second phase difference adjusting element being arranged between the liquid crystal panel and the second polarizing element and including a third liquid crystal layer.

According to an aspect of the present application, a control method of a liquid crystal device is a control method of a liquid crystal device, the liquid crystal device including a liquid crystal panel including a first liquid crystal layer, a first polarizing element provided on a light incidence side of the liquid crystal panel, a second polarizing element provided on a light emission side of the liquid crystal panel, a first phase difference adjusting element arranged between the first polarizing element and the liquid crystal panel and including a second liquid crystal layer, a second phase difference adjusting element arranged between the liquid crystal panel and the second polarizing element and including a third liquid crystal layer, and a control unit configured to control a value of a voltage applied to the first phase difference adjusting element and the second phase difference adjusting element, based on image data input to the liquid crystal panel, wherein the liquid crystal device controls the first phase difference and the second phase difference, based on brightness information or contrast information of an image displayed by the liquid crystal panel.

DESCRIPTION OF EXEMPLARY EMBODIMENTS

Exemplary embodiments of the present disclosure are described below with reference to the drawings.

Here, in each of the following drawings, scales of the members are made different from those of actual ones in order to make the members recognizable in size.

Further, in each of the following drawings, for convenience of explanation, description is made appropriately using an X-axis, a Y-axis, and a Z-axis that are orthogonal to one another. A direction along the X-axis is denoted with a direction X1, and a direction opposite to the direction X1 is denoted with a direction X2. A direction along the Y-axis is denoted with a direction Y1, and a direction opposite to the direction Y1 is denoted with a direction Y2. A direction along the Z-axis is denoted with a direction Z1, and a direction opposite to the direction Z1 is denoted with a direction Z2. Note that, in the present exemplary embodiment, the direction X1 corresponds to a first direction, and the direction Y1 corresponds to a second direction.

In the following description, viewing in the direction Z2 or the direction Z1 is expressed as a "plan view" or "planar". Further, viewing a cross-section containing the Z-axis in a vertical direction is expressed as a "cross-sectional view" or "cross-sectional".

Moreover, in the following description, for example, the expression "at a substrate" regarding a substrate indicates any one of a case of arrangement on a substrate in a contacting manner, a case of arrangement through another structure object on a substrate, and a case in which a part is arranged on a substrate in a contacting manner and another part is arranged through another structure object on the substrate.

1. First Exemplary Embodiment.

1.1 Outline of Projection-type Display Device using Liquid Crystal Device

Figure 1:
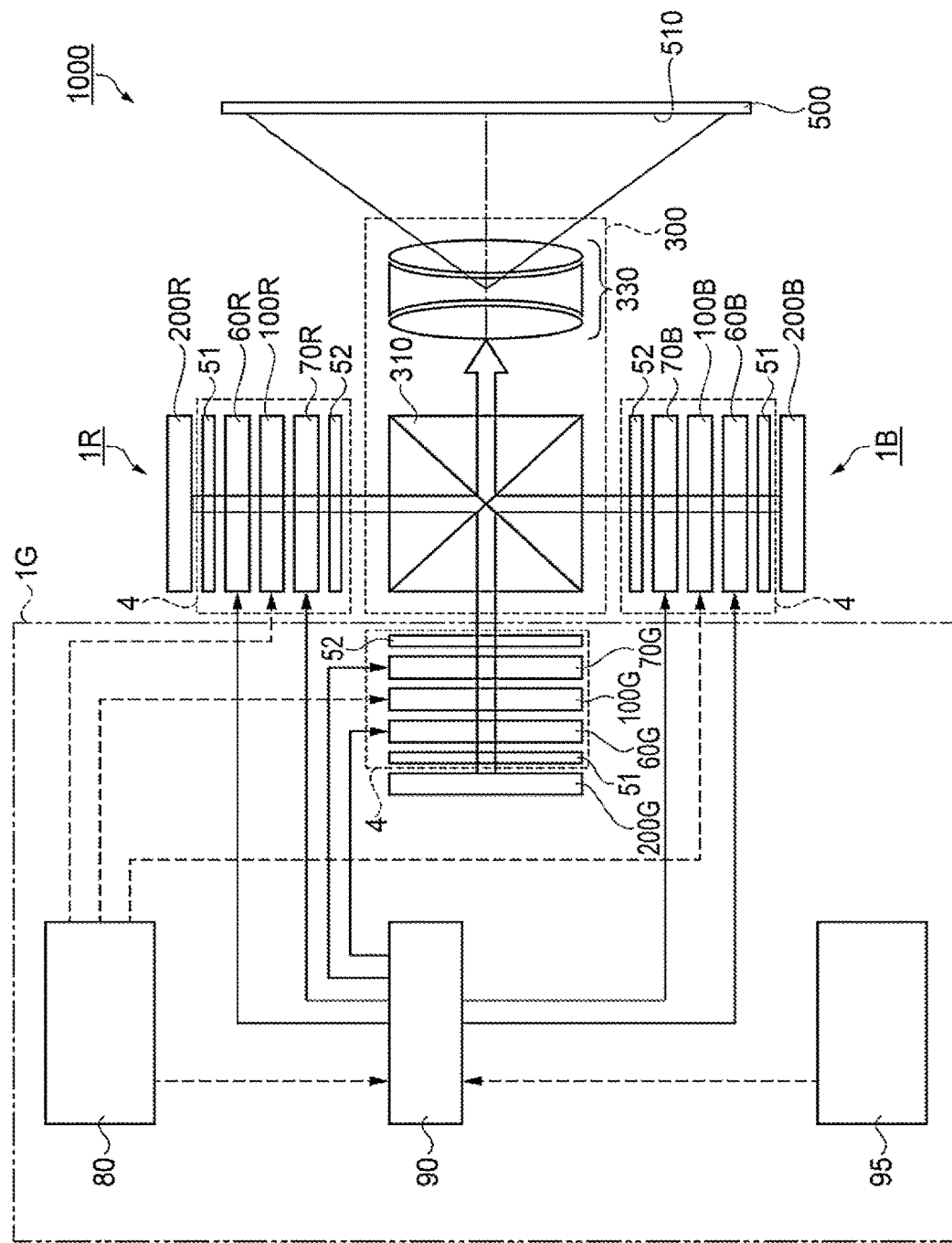
FIG. 1 is a schematic configuration diagram illustrating a projection-type display device using a liquid crystal device according to a first exemplary embodiment.

FIG. 1 is an explanatory diagram illustrating a schematic configuration of a projection-type display device using a liquid crystal device of the present exemplary embodiment.

In the present exemplary embodiment, a projection-type display device 1000 is an example of a display device. The projection-type display device 1000 is configured to include a liquid crystal device 1.

Note that, in the present exemplary embodiment, in the configurations included in the liquid crystal device 1, a configuration including a liquid crystal panel 100, a first polarizing plate 51 being a first polarizing element, a second polarizing plate 52 being a second polarizing element, a first phase difference controlling element 60, and a second phase difference controlling element 70, which are described later, is referred to as an optical modulation module 4 in some cases. The optical modulation module 4 is not required to include all the configurations included in the liquid crystal device 1, and is only required to include at least the first phase difference controlling element 60 being a first phase difference adjusting element and the second phase difference controlling element 70 being a second phase difference adjusting element, which are described later. In a functional sense, a function of converting linearly polarized light into desired polarized light between linearly polarized light and circularly polarized light and emitting the resultant light to the liquid crystal panel 100 and a function of converting the polarization state of the light, which is emitted from the liquid crystal panel 100, from the desired polarized light to linearly polarized light and emitting the resultant light are only required to be provided.

With regard to the configurations included in the optical modulation module 4, all the configurations are not required to be coupled physically to one another or formed integrally with one another. Even when the configurations or some of the configurations are physically away from each other, electric or optical relationship is only required to be established therebetween.

The projection-type display device 1000 includes three laser light sources 200R, 200G, and 200B corresponding to R, G, and B as light sources, three liquid crystal devices 1R, 1G, and 1B corresponding to R, G, and B as image display devices, and a projection optical system 300.

The laser light source 200R emits red-colored light. A wavelength λ of the red-colored light is from 620 nm to 750 nm. The laser light source 200G emits green-colored light. A wavelength λ of the green-colored light is from 495 nm to 570 nm. The laser light source 200B emits blue-colored light. A wavelength λ of the blue-colored light is from 400 nm to 480 nm.

Each of the liquid crystal devices 1R, 1G, and 1B includes the first polarizing plate 51 being a first polarizing element, the first phase difference controlling element 60 being a first phase difference adjusting element, the liquid crystal panel 100, the second phase difference controlling element 70 being a second phase difference adjusting element, and the second polarizing plate 52 being a second polarizing element. Note that, with regard to the first polarizing plate 51, when light emitted from the laser light sources 200R, 200G, and 200B is linearly polarized light, the first polarizing plate 51 may be omitted. When linearly polarized light emitted from the laser light sources 200R, 200G, and 200B directly enters the first phase difference controlling element 60, the laser light sources 200R, 200G, and 200B correspond to the first phase difference elements.

A liquid crystal panel 100R of the liquid crystal device 1R modulates the red-colored light emitted from the laser light source 200R, based on red tone data. A liquid crystal panel 100G of the liquid crystal device 1G modulates the green-colored light emitted from the laser light source 200G, based on green tone data. A liquid crystal panel 100B of the liquid crystal device 1B modulates the blue-colored light emitted from the laser light source 200B, based on blue tone data.

The first polarizing plate 51 adjusts polarization of the light emitted from the laser light source 200R, 200G, or 200B, and emits linearly polarized light to the first phase difference controlling element 60.

A first phase difference controlling element 60R of the liquid crystal device 1R is arranged between the first polarizing plate 51 and the liquid crystal panel 100R, and keeps the polarization state of the linearly polarized incident light as linearly polarized light or changes the polarization state from linearly polarized light to elliptically polarized light or circularly polarized light in accordance with a phase difference of the first phase difference controlling element 60R. Thus, the resultant light is emitted to the liquid crystal panel 100. Note that the phase difference of the first phase difference controlling element 60R is controlled to be variable within a range from 0 (zero) to $\lambda/4$, by a method described later.

When the phase difference is controlled to be zero, the first phase difference controlling element 60R emits the linearly polarized incident light from the first polarizing plate 51 without changing the polarization state thereof. When the phase difference is controlled to be $\lambda/8$, the first phase difference controlling element 60R changes the linearly polarized incident light from the first polarizing plate 51 to elliptically polarized light, and emits the resultant light. Similarly, when the phase difference is controlled to be $\lambda/4$, the first phase difference controlling element 60R changes the linearly polarized light to circularly polarized light, and emits the resultant light.

Note that a first phase difference controlling element 60G of the liquid crystal device 1G and a first phase difference controlling element 60B of the liquid crystal device 1B are configured similarly to the first phase difference controlling element 60R.

A second phase difference controlling element 70R of the liquid crystal device 1R is arranged between the liquid crystal panel 100R and the second polarizing plate 52, and the phase difference of the second phase difference controlling element 70R is controlled so that the polarization state of the light emitted from the liquid crystal panel 100R is linearly polarized light.

When the phase difference of the first phase difference controlling element 60R is set to be zero, the phase difference of the second phase difference controlling element 70R is also set to be zero, and the second phase difference controlling element 70R causes the linearly polarized light emitted from the liquid crystal panel 100R to pass therethrough without changing the polarization state of the linearly polarized light.

When the phase difference of the first phase difference controlling element 60R is set to be $\lambda/8$, the phase difference of the second phase difference controlling element 70R is also set to be $\lambda/8$, and the second phase difference controlling element 70R changes the elliptically polarized light emitted from the liquid crystal panel 100R to linearly polarized light, and emits the resultant light. Similarly, when the phase difference of the first phase difference controlling element 60R is set to be $\lambda/4$, the phase difference of the second phase difference controlling element 70R is also set to be $\lambda/4$, and the second phase difference controlling element 70R changes the circularly polarized light emitted from the liquid crystal panel 100R to linearly polarized light, and emits the resultant light.

Note that a second phase difference controlling element 70G of the liquid crystal device 1G and a second phase difference controlling element 70B of the liquid crystal device 1B are configured similarly to the second phase difference controlling element 70R.

The second polarizing plate 52 detects the light emitted from the second phase difference controlling element 70, and causes the light to enter a dichroic prism 310.

The dichroic prism 310 synthesizes the light emitted from the liquid crystal panel 100R, the light emitted from the liquid crystal panel 100G, and the light emitted from the liquid crystal panel 100B.

A projection lens 330 projects the light emitted from the dichroic prism 310 onto a projection surface 510 of the screen 500 in a magnified manner.

The liquid crystal device 1R includes an image processing unit 80, a phase difference adjusting unit 90, and a brightness detecting unit 95. Note that one image processing unit 80, one phase difference adjusting unit 90, and one brightness detecting unit 95 are only required to be provided in common for the liquid crystal devices 1R, 1G, and 1B, but also there may be adopted a configuration in which each of the liquid crystal devices 1R, 1G, and 1B includes the image processing unit 80, the phase difference adjusting unit 90, and the brightness detecting unit 95.

The image processing unit 80 supplies tone data for respective colors to the liquid crystal panels 100R, 100G, and 100B, based on image data. The image processing unit 80 analyzes the image data, and outputs the analysis information to the phase difference adjusting unit 90. In the present exemplary embodiment, for example, the analysis information is average luminance information or contrast information. Note that the analysis information is not limited thereto, and may be content information relating to a movie, sports, a game, scenery, a character, a moving image, a still image, and the like.

The brightness detecting unit 95 detects brightness of a location in which the screen 500 is installed, and outputs the detected brightness information to the phase difference adjusting unit 90.

Based on the analysis information from the image processing unit 80 and/or the brightness information from the brightness detecting unit 95, the phase difference adjusting unit 90 outputs phase difference control signals RcR, RcG, and RcB for controlling phase difference of the first phase difference controlling elements 60 and the second phase difference controlling elements 70.

1.2. Outline of Liquid Crystal Panel Combined with Liquid Crystal Device

Figure 2:
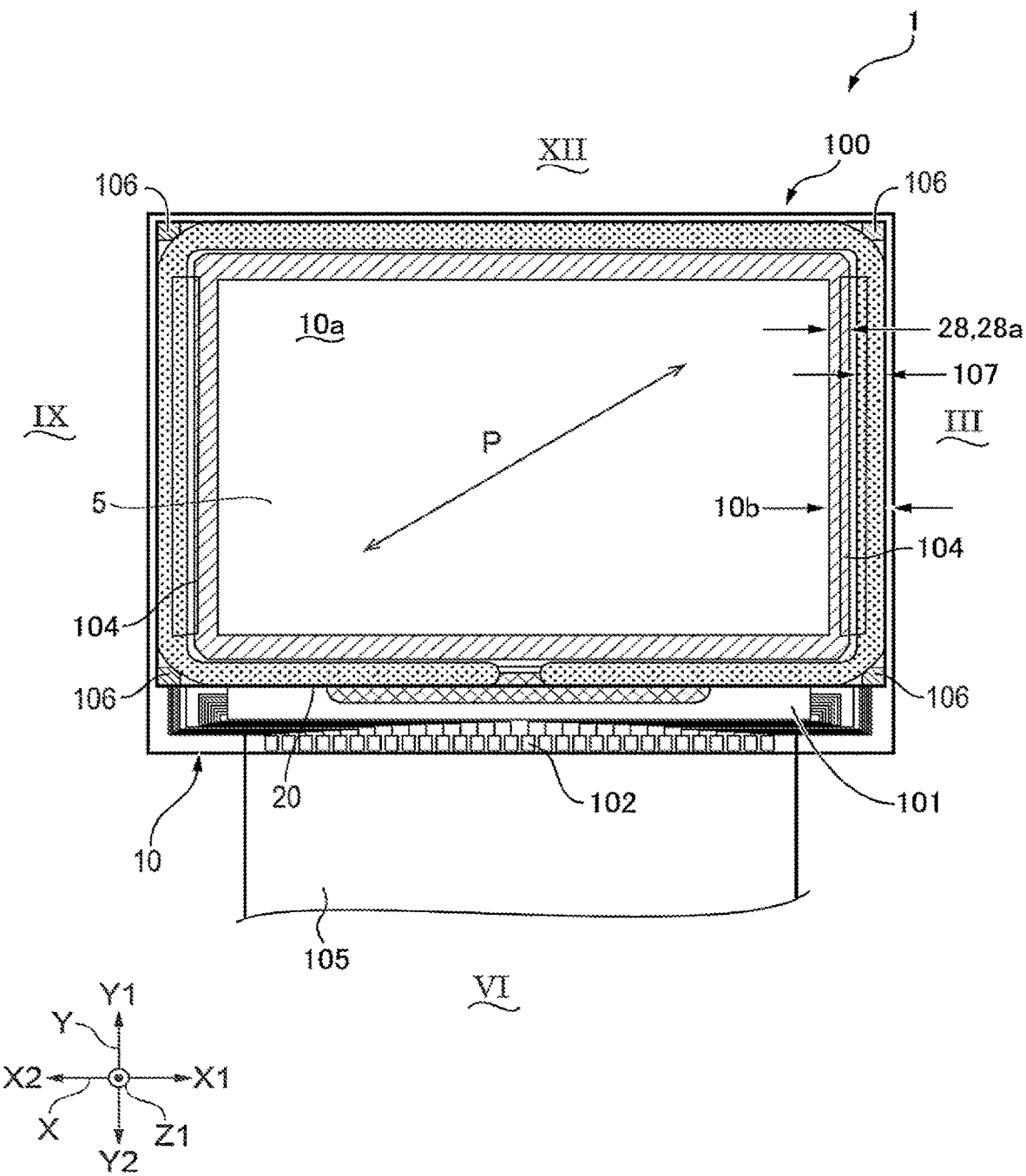
FIG. 2 is a plan view illustrating an aspect of a liquid crystal panel combined with the liquid crystal device.

FIG. 2 is a plan view illustrating a schematic configuration of the liquid crystal panel combined with the liquid crystal device, and illustrates a state in which the liquid crystal panel 100 is viewed in the direction Z2. Note that each of the liquid crystal panels 100R, 100G, and 100B is configured similarly to the liquid crystal panel 100.

In the present exemplary embodiment, as the liquid crystal panel 100, an active drive type liquid crystal panel including a Thin Film Transistor (TFT) as a pixel transistor for each pixel is described as an example.

In the liquid crystal panel 100, a first transmissive substrate 10 and a second transmissive substrate 20 are laminated together by a seal material 107 with a predetermined gap in between. The seal material 107 is provided along an outer edge of the second substrate 20 to have a frame shape. A liquid crystal layer 5 being a first liquid crystal layer is arranged in a region surrounded by the seal material 107 between the first substrate 10 and the second substrate 20.

In the liquid crystal panel 100, the first substrate 10 and the second substrate 20 each have a quadrangular shape. In a substantially central portion of the liquid crystal panel 100, a display region 10a is provided as a rectangular region having a longer dimension in the direction from 3 o'clock III toward 9 o'clock IX on an analog clock and a shorter dimension in the direction from 12 o'clock XII toward 6 o'clock VI on an analog clock. The display region 10a is surrounded by a peripheral region 10b. Note that the direction from 3 o'clock III toward 9 o'clock IX on an analog clock is a direction along the X-axis, and the direction from 12 o'clock XII toward 6 o'clock VI on an analog clock is a direction along the Y-axis.

The peripheral region 10b having a rectangular frame shape is provided between the display region 10a and an outer peripheral edge of the second substrate 20. The seal material 107 is provided in a substantially rectangular frame shape in the peripheral region 10b.

A data line drive circuit 101, a plurality of terminals 102, and a scanning line drive circuit 104 are arranged on the outer side of the display region 10a in a surface of the first substrate 10 on the side of the second substrate 20.

A flexible wiring substrate 105 is coupled to the terminals 102, and various potentials and various signals are input to the first substrate 10 via the flexible wiring substrate 105.

A light-blocking film 28 having light-blocking properties formed from a metal compound or the like is formed at the second substrate 20. For example, the light-blocking film 28 is a partition 28a arranged along an outer peripheral edge of the display region 10a.

The first substrate 10 includes an inter-substrate conduction electrode 106 formed in a region positioning outside the seal material 107 and overlapping with a corner portion of the second substrate 20 so that electrical conduction is established between the first substrate 10 and the second substrate 20.

Note that the direction P illustrated in FIG. 2 indicates an alignment direction of liquid crystal molecules 5a of the liquid crystal layer 5. In the present exemplary embodiment, the alignment direction P is a direction from 01:30 toward 7:30 on an analog clock in plan view.

1.3. Outline of Cross-sectional Configuration of Liquid Crystal Device

Figure 3:
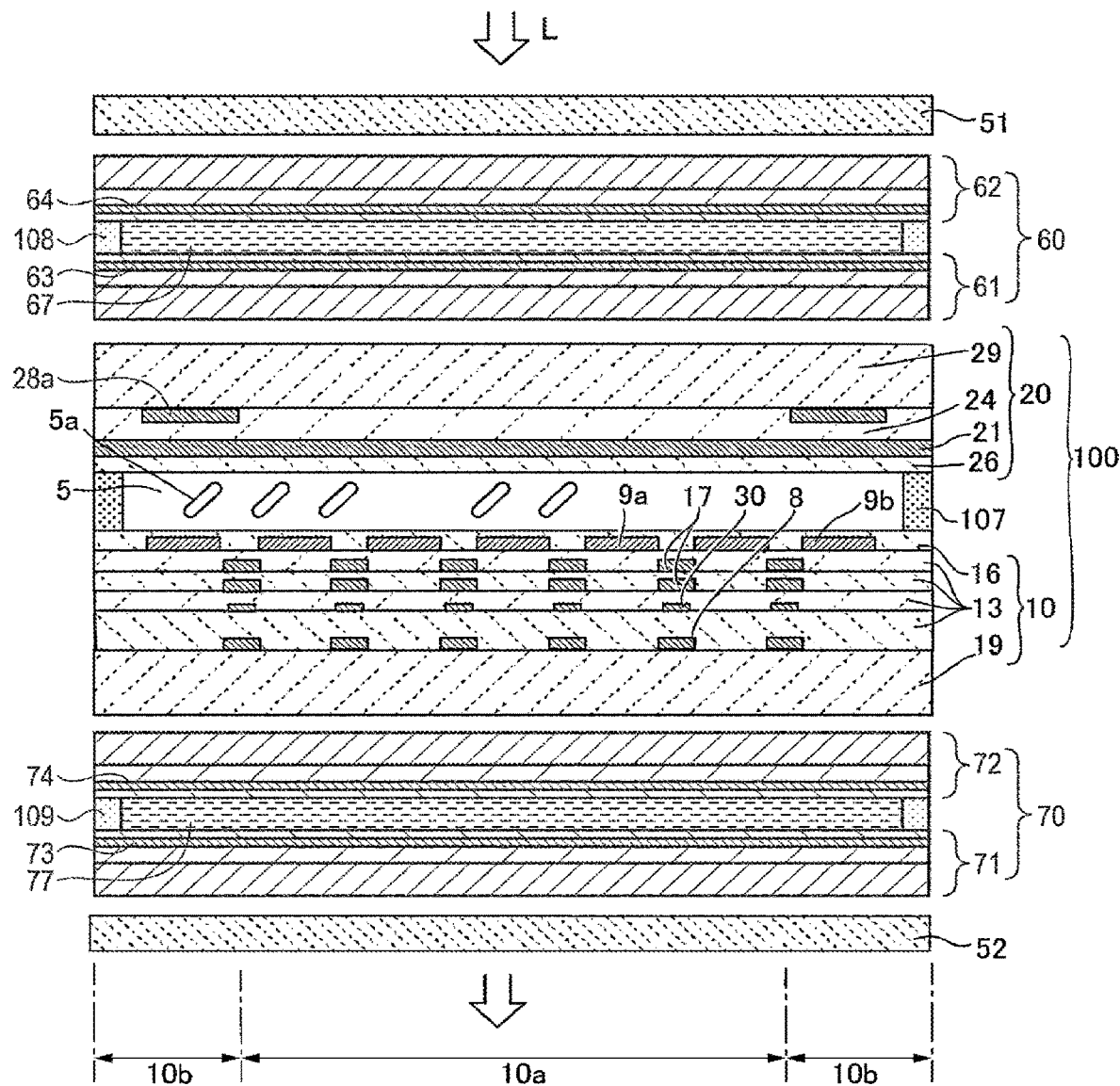
FIG. 3 is an explanatory diagram schematically illustrating a cross-section of the liquid crystal device.

FIG. 3 is a cross-sectional view schematically illustrating a cross-section of the liquid crystal device of the present exemplary embodiment.

The liquid crystal device 1 includes the first polarizing plate 51, the first phase difference controlling element 60, the liquid crystal panel 100, the second phase difference controlling element 70, and the second polarizing plate 52 that are arranged sequentially from an incidence side of light L emitted from the laser light source 200.

In the display region 10a of the first substrate 10 of the liquid crystal panel 100, a plurality of transmissive pixel electrodes 9a, each of which is formed of a transmissive conductive film such as an Indium Tin Oxide (ITO) film, and pixel switching elements 30, each of which is electrically coupled to a respective one of the plurality of pixel electrodes 9a, are provided in a matrix pattern. Wiring lines 8 and 17 having light-blocking properties are provided between a plurality of insulating films 13 laminated between a substrate body 19 and the pixel electrodes 9a. A first alignment film 16 formed of a diagonally vapor-deposited inorganic film is formed at the side of the second substrate 20 with respect to the pixel electrodes 9a, and the pixel electrodes 9a are covered with the first alignment film 16.

In the peripheral region 10b of the first substrate 10, dummy pixel electrodes 9b are formed. In the present exemplary embodiment, the first substrate 10 includes a configuration from the substrate body 19 to the first alignment film 16.

The second substrate 20 includes a transmissive substrate body 29 such as quartz and glass. In a substantially entire surface of the second substrate 20 on the side of the first substrate 10, a transmissive common electrode 21 formed of an ITO film or the like is formed. A second alignment film 26 formed of a diagonally vapor-deposited inorganic film is provided between the common electrode 21 and the liquid crystal layer 5.

The partition 28a is formed between the common electrode 21 and a protective layer 24 of the peripheral region 10b on a side opposite to the first substrate 10 with respect to the common electrode 21. The partition 28a overlaps with the dummy pixel electrode 9b of the first substrate 10 in plan view. In the present exemplary embodiment, the second substrate 20 includes a configuration from the substrate body 29 to the second alignment film 26.

The liquid crystal panel 100 is configured as a Vertical Alignment (VA) mode liquid crystal panel in which the liquid crystal molecules 5a having a negative dielectric anisotropy is sandwiched between the first substrate 10 and the second substrate 20 with the seal material 107. In the liquid crystal panel 100 thus configured, upon a voltage applied between the pixel electrodes 9a and the common electrode 21, the liquid crystal molecules 5a of the liquid crystal layer 5 are displaced to reduce the tilt angle with respect to the first substrate 10 and the second substrate 20.

Each of the first phase difference controlling element 60 and the second phase difference controlling element 70 is a VA mode liquid crystal panel similarly to the liquid crystal panel 100.

The first phase difference controlling element 60 includes a fourth substrate 62 arranged on the incidence side of the light L and a third substrate 61 arranged on the emission side of the light L. A liquid crystal layer 67 being a second liquid crystal layer having a negative dielectric anisotropy is sandwiched between the third substrate 61 and the fourth substrate 62 that are laminated together by a seal material 108. The third substrate 61 includes an electrode 63 being a first electrode, and the fourth substrate 62 includes an electrode 64 being a second electrode.

The second phase difference controlling element 70 includes a sixth substrate 72 arranged on the incidence side of the light L and a fifth substrate 71 arranged on the emission side of the light L. A liquid crystal layer 77 being a third liquid crystal layer having a negative dielectric anisotropy is sandwiched between the fifth substrate 71 and the sixth substrate 72 that are laminated together by a seal material 109. The fifth substrate 71 includes an electrode 73 being a third electrode, and the sixth substrate 72 includes an electrode 74 being a fourth electrode.

In the present exemplary embodiment, the third substrate 61, the fourth substrate 62, the fifth substrate 71, and the sixth substrate 72 are configured similarly to the second substrate 20 of the liquid crystal panel 100. Note that the partition 28a of the second substrate 20 is not a necessary configuration in the third substrate 61, the fourth substrate 62, the fifth substrate 71, and the sixth substrate 72.

In the present exemplary embodiment, similarly to the first substrate 10 of the liquid crystal panel 100, the third substrate 61 and the fifth substrate 71 may be configured to include the pixel electrodes 9a. The pixel electrodes 9a provided at the third substrate 61 and the fifth substrate 71 may have a size larger than the pixel electrodes 9a of the liquid crystal panel 100. When the third substrate 61 and the fifth substrate 71 are provided with the pixel electrodes 9a, there may be adopted a configuration in which a phase difference can be controlled for each region in accordance with a size of a respective one of the pixel electrodes 9a. Note that there may be adopted a configuration in which the pixel electrodes 9a are provided at the fourth substrate 62 and the sixth substrate 72.

In the first phase difference controlling element 60 and the second phase difference controlling element 70, when a voltage is not applied between the electrodes 63 and 64 that drive the liquid crystal layer 67 and between the electrodes 73 and 74 that drive the liquid crystal layer 77, the liquid crystal molecules of the liquid crystal layers 67 and 77 are aligned vertically with respect to the respective substrate surfaces. In this case, the phase differences of the first phase difference controlling element 60 and the second phase difference controlling element 70 are both zero, and the first phase difference controlling element 60 and the second phase difference controlling element 70 causes the incident light to pass therethrough without changing the polarization state the light.

Meanwhile, when a voltage is applied between the electrodes 63 and 64 and between the electrodes 73 and 74 in the first phase difference controlling element 60 and the second phase difference controlling element 70, and a value of a voltage to be applied is increased, the liquid crystal molecules of the liquid crystal layers 67 and 77 are gradually tilted in a direction parallel to the respective substrate surfaces. Along with this, the phase differences of the first phase difference controlling element 60 and the second phase difference controlling element 70 are gradually increased.

The first phase difference controlling element 60 is arranged so that the slow axis forms an angle of 45 degrees with respect to the polarization axis of the first polarizing plate 51, and the second phase difference controlling element 70 is arranged so that the slow axis forms an angel of 45 degrees with respect to the polarization axis of the second polarizing plate 52. In other words, the first phase difference controlling element 60 and the second phase difference controlling element 70 are arranged so that the respective slow axes are orthogonal to each other.

The first polarizing plate 51 and the second polarizing plate 52 are arranged in a crossed-Nicols state in which the polarization axes form an angle of 90 degrees. The liquid crystal panel 100 is configured so that the alignment direction P of the liquid crystal molecules 5a forms an angle of 45 degrees with respect to the polarization axes of the first polarizing plate 51 and the second polarizing plate 52.

In the present exemplary embodiment, the slow axis of the first phase difference controlling element 60 is arranged to be parallel to the alignment direction P of the liquid crystal panel 100, and the slow axis of the second phase difference controlling element 70 is arranged to be orthogonal to the alignment direction P of the liquid crystal panel 100. Note that arrangement may be made so that the slow axis of the first phase difference controlling element 60 is orthogonal to the alignment direction P of the liquid crystal panel 100 and the slow axis of the second phase difference controlling element 70 is parallel to the alignment direction P of the liquid crystal panel 100.

With this arrangement, the first phase difference controlling element 60 and the second phase difference controlling element 70 control a value of a voltage applied to the liquid crystal layers 67 and 77 and control the phase differences of the liquid crystal layers 67 and 77 to the desired values, so that the polarization state of the light entering the first phase difference controlling element 60 and the second phase difference controlling element 70 can remain as linearly polarized light without changing, can be changed from linearly polarized light to elliptically polarized light or circularly polarized light, or can be changed from elliptically polarized light or circularly polarized light to linearly polarized light.

Note that the angle formed between the polarization axis of the first polarizing plate 51 and the polarization axis of the second polarizing plate 52, the angle formed between the slow axis of the first phase difference controlling element 60 and the slow axis of the second phase difference controlling element 70, and the angle formed between the alignment direction P and the slow axis of the second phase difference controlling element 70 or the first phase difference controlling element 60 are not limited to 90 degrees. In consideration of a tolerance and the like in manufacturing, the angle is only required to fall within a range of 90 degrees ±5 degrees.

The angle formed between the polarization axes of the first polarizing plate 51 and the second polarizing plate 52 and the alignment direction P, the angle formed between the slow axis of the first phase difference controlling element 60 and the polarization axis of the first polarizing plate 51, and the angle formed between the slow axis of the second phase difference controlling element 70 and the second polarizing plate 52 are not limited to 45 degrees. In consideration of a tolerance and the like in manufacturing, the angle is only required to fall within a range of 45 degrees ±5 degrees.

Further, the angle formed between the alignment direction P and the slow axis of the first phase difference controlling element 60 or the second phase difference controlling element 70 is not limited to 0 degree. In consideration of a tolerance and the like in manufacturing, the angle is only required to fall within a range of 0 degree ±5 degrees.

In the present exemplary embodiment, the liquid crystal panel 100 and the first phase difference controlling element 60 are provided as separate configurations, but may be an integrated configuration. In this case, for example, there may be adopted a configuration in which the third substrate 61 is formed at the substrate body 29. Similarly, the liquid crystal panel 100 and the second phase difference controlling element 70 may be an integrated configuration. In this case, for example, there may be adopted a configuration in which the sixth substrate 72 is formed at the substrate body 19.

1.4. Outline of Configuration of Liquid Crystal Layer

Figure 4:
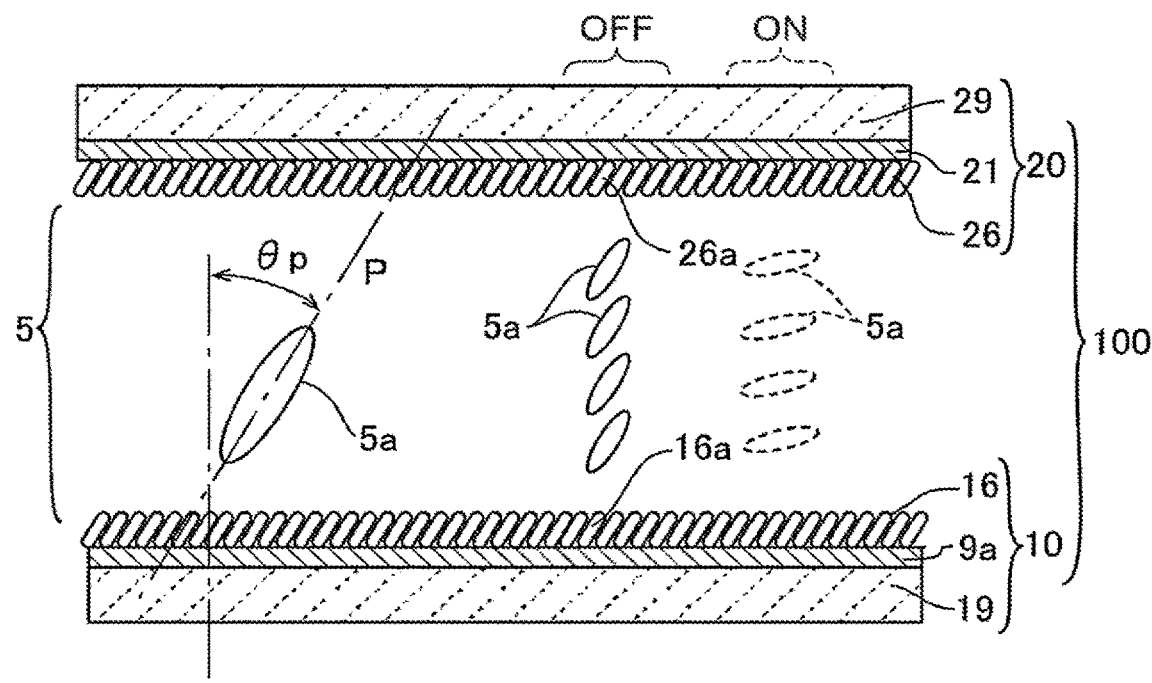
FIG. 4 is an explanatory diagram schematically illustrating a configuration of a liquid crystal layer of the liquid crystal panel.

FIG. 4 is an explanatory diagram schematically illustrating a configuration of the liquid crystal layer of the liquid crystal panel.

The first alignment film 16 and the second alignment film 26 of the liquid crystal panel 100 each include a columnar structure layer in which columnar bodies 16a or 26a each named a column are obliquely formed with respect to the substrate body 19 or 29. Thus, in the first alignment film 16 and the second alignment film 26, the liquid crystal molecules 5a are aligned diagonally with respect to the first substrate 10 and the second substrate 20 so as to cause the liquid crystal molecules 5a to be pre-tilted.

A pre-tilt angle θp refers to an angle defined between a direction vertical to the first substrate 10 and the second substrate 20 and the major axis of the liquid crystal molecules 5a, in other words, the alignment direction P, in an OFF state in which no voltage is applied between the pixel electrodes 9a and the common electrode 21. In the present exemplary embodiment, the pre-tilt angle θp is 5 degrees, for example.

In an ON state in which a voltage is applied between the pixel electrodes 9a and the common electrode 21, the liquid crystal molecules 5a are displaced to reduce the tilt angle with respect to the first substrate 10 and the second substrate 20 along the alignment direction P, as indicated with the broken line. The alignment direction P described herein is a so-called clear vision direction.

The liquid crystal layers 67 and 77 of the first phase difference controlling element 60 and the second phase difference controlling element 70 are also configured similarly to the liquid crystal panel 100. In the first phase difference controlling element 60 and the second phase difference controlling element 70, the alignment directions of the liquid crystal molecules of the liquid crystal layers 67 and 77 are the directions of the slow axes.

Figure 5A:
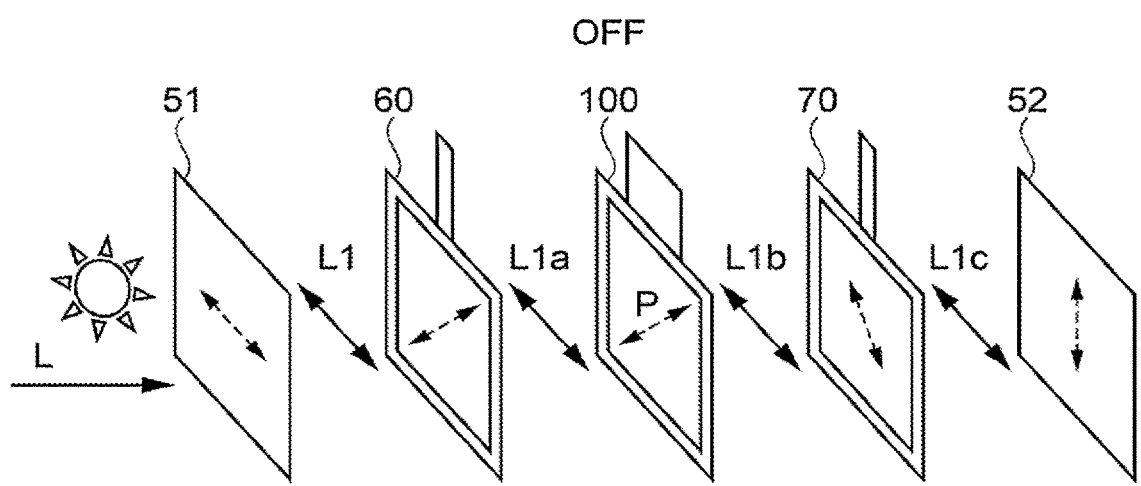
FIG. 5A is an explanatory diagram of a first mode.
Figure 5B:
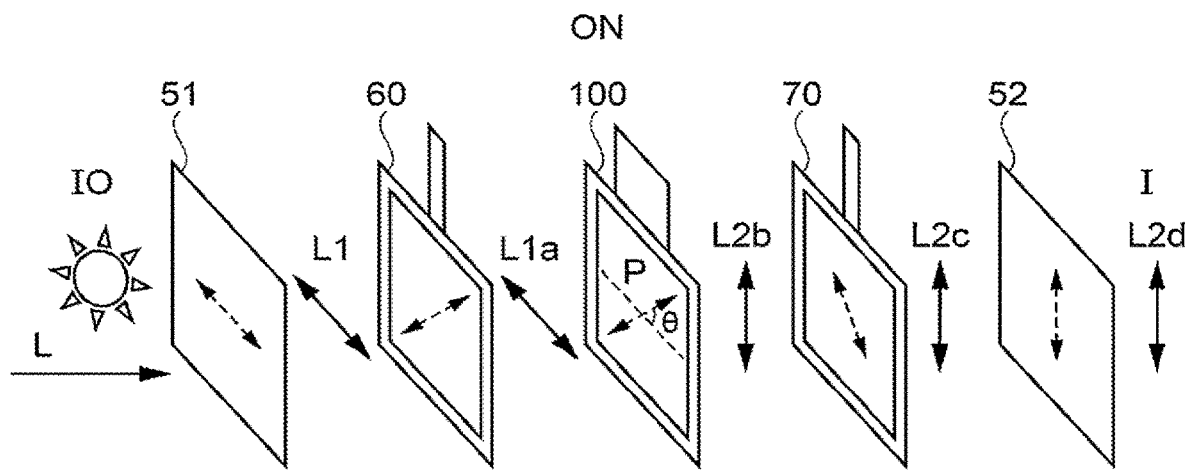
FIG. 5B is an explanatory diagram of the first mode.

1.5. Outline of Linearly Polarized Light Mode and Elliptically Polarized Light or Circularly Polarized Light Mode Each of FIG. 5A and FIG. 5B is an explanatory diagram of a first mode. In the first mode, the phase differences of the first phase difference controlling element 60 and the second phase difference controlling element 70 are controlled to be zero. FIG. 5A illustrates the OFF state in which no voltage is applied between the pixel electrodes 9a and the common electrode 21 of the liquid crystal panel 100, and FIG. 5B illustrates the ON state in which a voltage is applied between the pixel electrodes 9a and the common electrode 21 of the liquid crystal panel 100.

Figure 6A:
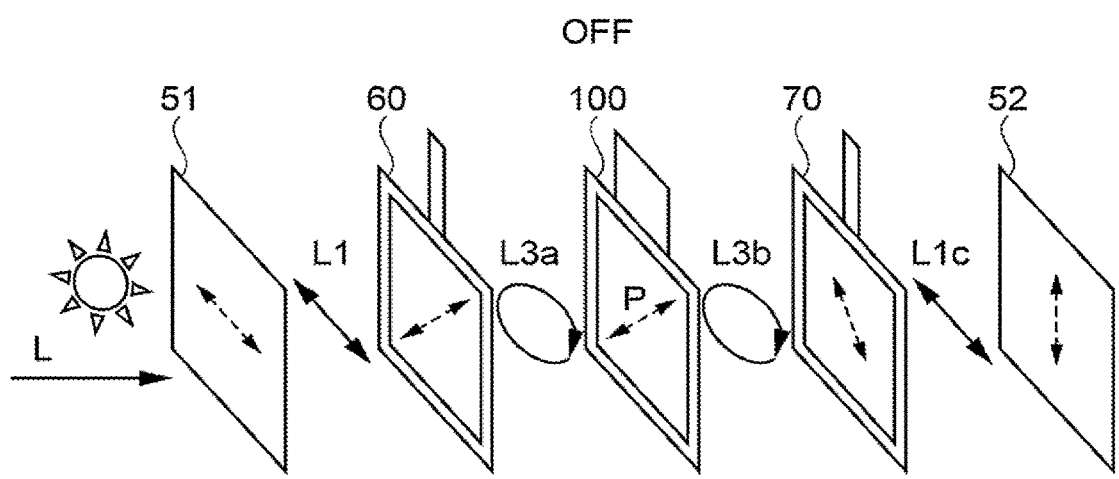
FIG. 6A is an explanatory diagram of a second mode.
Figure 6B:
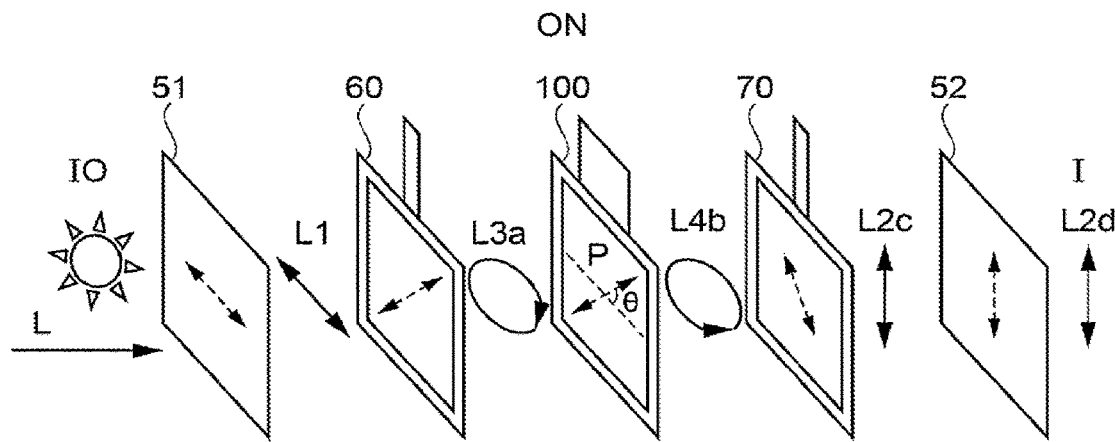
FIG. 6B is an explanatory diagram of the second mode.

Each of FIG. 6A and FIG. 6B is an explanatory diagram of a second mode. In the second mode, the phase differences of the first phase difference controlling element 60 and the second phase difference controlling element 70 are controlled to be any one of λ/24, λ/12, λ/8, λ/6, and λ/4, for example. FIG. 6A illustrates the OFF state in which no voltage is applied between the pixel electrodes 9a and the common electrode 21 of the liquid crystal panel 100, and FIG. 6B illustrates the ON state in which a voltage is applied between the pixel electrodes 9a and the common electrode 21 of the liquid crystal panel 100.

In FIG. 5A, FIG. 5B, FIG. 6A, and FIG. 6B, the polarization axis of the first polarizing plate 51, the slow axis of the first phase difference controlling element 60, the alignment direction P of the liquid crystal molecules 5a of the liquid crystal panel 100, the slow axis of the second phase difference controlling element 70, and the polarization axis of the second polarizing plate 52 are indicated with the respective broken lines, and the polarization state of the light and the like are indicated with the solid lines.

In the present exemplary embodiment, the alignment direction P of the liquid crystal molecules 5a of the liquid crystal panel 100 and the slow axis of the first phase difference controlling element 60 are parallel to each other, and the slow axis of the first phase difference controlling element 60 and the slow axis of the second phase difference controlling element 70 are orthogonal to each other.

In the present exemplary embodiment, a value R of each of the phase differences of the first phase difference controlling element 60 and the second phase difference controlling element 70 is controlled to be a value falling within a range from zero to λ/4 when a wavelength of the incident light into the liquid crystal panel 100 is λ.

Note that the first phase difference controlling element 60 and the second phase difference controlling element 70 are each controlled to have the same phase difference.

Next, with reference to FIG. 5A and FIG. 5B, description is made on the phase differences of the first phase difference controlling element 60 and the second phase difference controlling element 70 in the first mode.

As illustrated in FIG. 5A and FIG. 5B, when each of the phase differences of the first phase difference controlling element 60 and the second phase difference controlling element 70 is zero, first linearly polarized light L1 emitted from the first polarizing plate 51 passes through the first phase difference controlling element 60 while maintaining the polarization state, and enters the liquid crystal panel 100 as first linearly polarized light L1a.

As illustrated in FIG. 5A, when a pixel of the liquid crystal panel 100 is in the OFF state corresponding to black display, the liquid crystal panel 100 emits first linearly polarized light L1b, and the first linearly polarized light L1b entering the second phase difference controlling element 70 is emitted while maintaining the polarization state. Therefore, first linearly polarized light L1c emitted from the second phase difference controlling element 70 is not emitted from the second polarizing plate 52.

In contrast, when a pixel of the liquid crystal panel 100 is in the ON state corresponding to white display, the liquid crystal panel 100 emits second linearly polarized light L2b. The second linearly polarized light L2b passes through the second phase difference controlling element 70 while maintaining the polarization state, enters the second polarizing plate 52 as second linearly polarized light L2c, and is emitted as second linearly polarized light L2d.

An emission light amount I of the second linearly polarized light L2d emitted from the second polarizing plate 52 is expressed in Equation given below.

$$I = I0 \cdot \sin^2(2\theta) \cdot \sin^2(n \cdot \Delta nd/\lambda) \quad \text{Equation (1)}$$

I0=amount of incident light
θ=angle formed between the alignment direction P of the liquid crystal layer 5 and the polarization axis of the first polarizing plate 51
n=refractive index of the liquid crystal layer 5
Δnd=retardation of the liquid crystal layer 5
λ=wavelength of incident light Therefore, the emission light amount I is affected by the angle θ formed between the alignment direction P of the liquid crystal layer 5 and the polarization axis of the first polarizing plate 51. Here, the polarization axis of the polarizing plate corresponds to the optical axis direction of the light being the first linearly polarized light L1a entering the liquid crystal panel 100. Therefore, when alignment of the liquid crystal molecules 5a is disturbed due to a horizontal electric field, the emission light amount I is affected thereby, and a black part is generated on a white screen.

Next, with reference to FIG. 6A and FIG. 6B, description is made on the phase differences of the first phase difference controlling element 60 and the second phase difference controlling element 70 in the second mode.

In a case in which the values of the phase differences of the first phase difference controlling element 60 and the second phase difference controlling element 70 are λ/4, when the first linearly polarized light L1 enters the first phase difference controlling element 60 with the oscillation direction thereof being at an angle of θ=+45 degrees with respect to the slow axis of the first phase difference controlling element 60, the light emitted from the first phase difference controlling element 60 is clockwise circularly polarized light L3a. In contrast, when the oscillation direction of the first linearly polarized light L1 and the slow axis of the first phase difference controlling element 60 form an angle of θ=−45 degrees, counter-clockwise circularly polarized light L3a is caused.

In the present exemplary embodiment, as illustrated in FIG. 6A, in the liquid crystal panel 100, the first linearly polarized light L1 emitted from the first polarizing plate 51 enters the first phase difference controlling element 60, and the clockwise circularly polarized light L3a enters the liquid crystal panel 100.

Here, when the pixel of the liquid crystal panel 100 is in the OFF state corresponding to black display, the liquid crystal panel 100 emits clockwise circularly polarized light L3b. As a result, the clockwise circularly polarized light L3b enters the second phase difference controlling element 70. Therefore, the second phase difference controlling element 70 emits the first linearly polarized light L1c, and hence the display light is not emitted from the second polarizing plate 52.

In contrast, when a pixel of the liquid crystal panel 100 is in the ON state corresponding to white display, the liquid crystal panel 100 emits counter-clockwise circularly polarized light L4b. As a result, the counter-clockwise circularly polarized light enters the second phase difference controlling element 70. Therefore, the second phase difference controlling element 70 emits the second linearly polarized light L2c, and the second linearly polarized light L2c passes through the second polarizing plate 52, and is emitted as the second linearly polarized light L2d.

Here, when light entering the liquid crystal panel 100 is the circularly polarized light L3a, the member $\sin^2(2\theta)$ in Equation (1) is not present, and hence the emission light amount I is expressed in the following equation. Thus, even when alignment of the liquid crystal molecules 5a is disturbed due to a horizontal electric field, the emission light amount I is not affected thereby, and generation of a black part on a white screen can be suppressed. Thus, when the phase differences of the first phase difference controlling element 60 and the second phase difference controlling element 70 are set to be λ/4, an influence of an alignment failure due to a reverse tilt domain can be suppressed most.

$$I = I0 \cdot \sin^2(\pi \cdot \Delta nd/\lambda) \quad \text{Equation (2)}$$

However, when the light entering the liquid crystal panel 100 is the circularly polarized light L3a, light leakage of the circularly polarized light L3a entering the liquid crystal panel 100 is easily caused by a phase change at the time of reflection on the side surfaces of the wiring lines 8 and 17 or the like, which easily degrades a contrast ratio.

Figure 7:
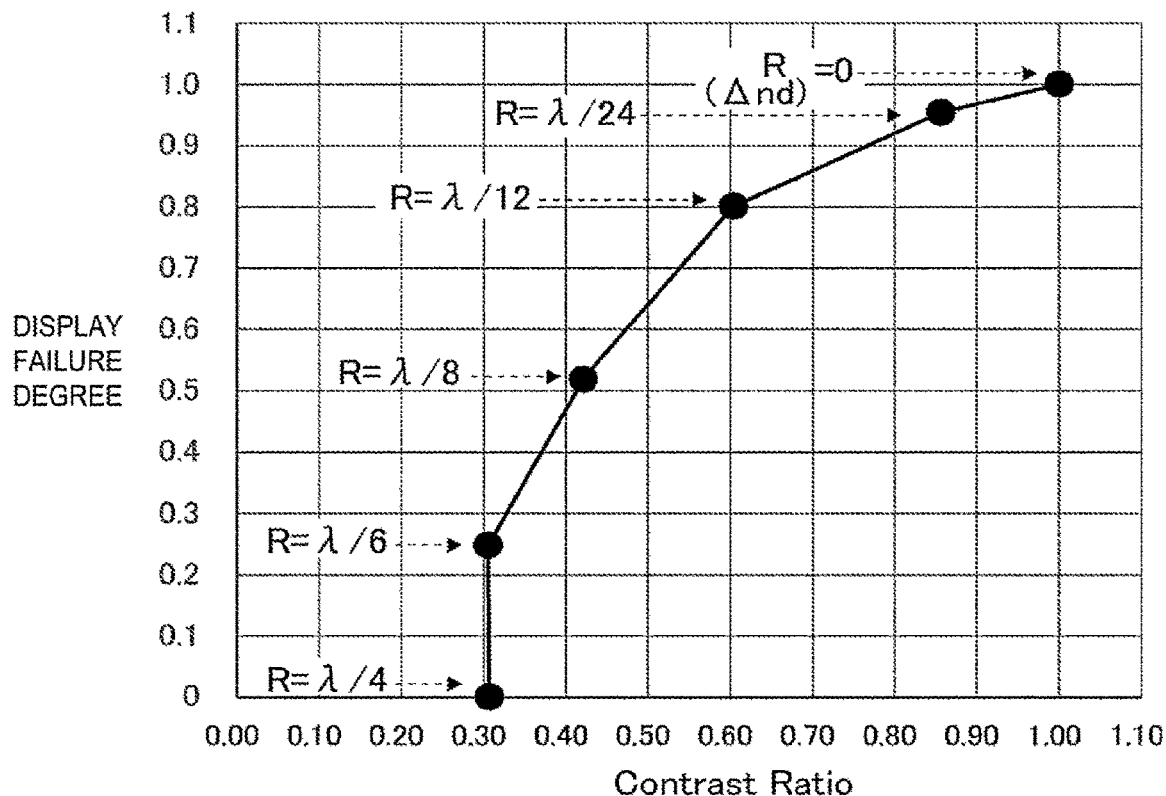
FIG. 7 is a graph showing a relationship between phase differences of phase difference adjusting elements and display quality of an image.

FIG. 7 is a graph showing a relationship between the phase differences of the phase difference controlling elements and display quality of an image. The horizontal axis indicates a Contrast Ratio, and indicates that the contrast ratio is higher on the right side than the left side of the graph. The vertical axis indicates a degree of an alignment failure, and indicates that an influence of an alignment failure is larger on the upper side than on the lower side of the graph.

FIG. 7 illustrates an influence on an alignment failure of the liquid crystal panel 100 and a change of the contrast ratio when the phase differences of the first phase difference controlling element 60 and the second phase difference controlling element 70 are changed from zero to λ/4.

When the phase differences of the first phase difference controlling element 60 and the second phase difference controlling element 70 are controlled to be zero, in other words, in a linearly polarized light mode being the first mode, degradation of display quality due to an alignment failure cannot be improved, but a screen with a high contrast ratio can be displayed.

When the phase differences of the first phase difference controlling element 60 and the second phase difference controlling element 70 are controlled to be closer to λ/4, in other words, in an elliptically polarized light or circularly polarized light mode being the second mode, the contrast ratio is reduced, but degradation of display quality due to an alignment failure is improved.

In the present exemplary embodiment, based on screen data to be displayed or brightness of a room where display takes place, the values R of the phase differences of the first phase difference controlling element 60 and the second phase difference controlling element 70 are set to values falling within a range from zero to λ/4.

1.6. Outline of Phase Difference Control

Figure 8:
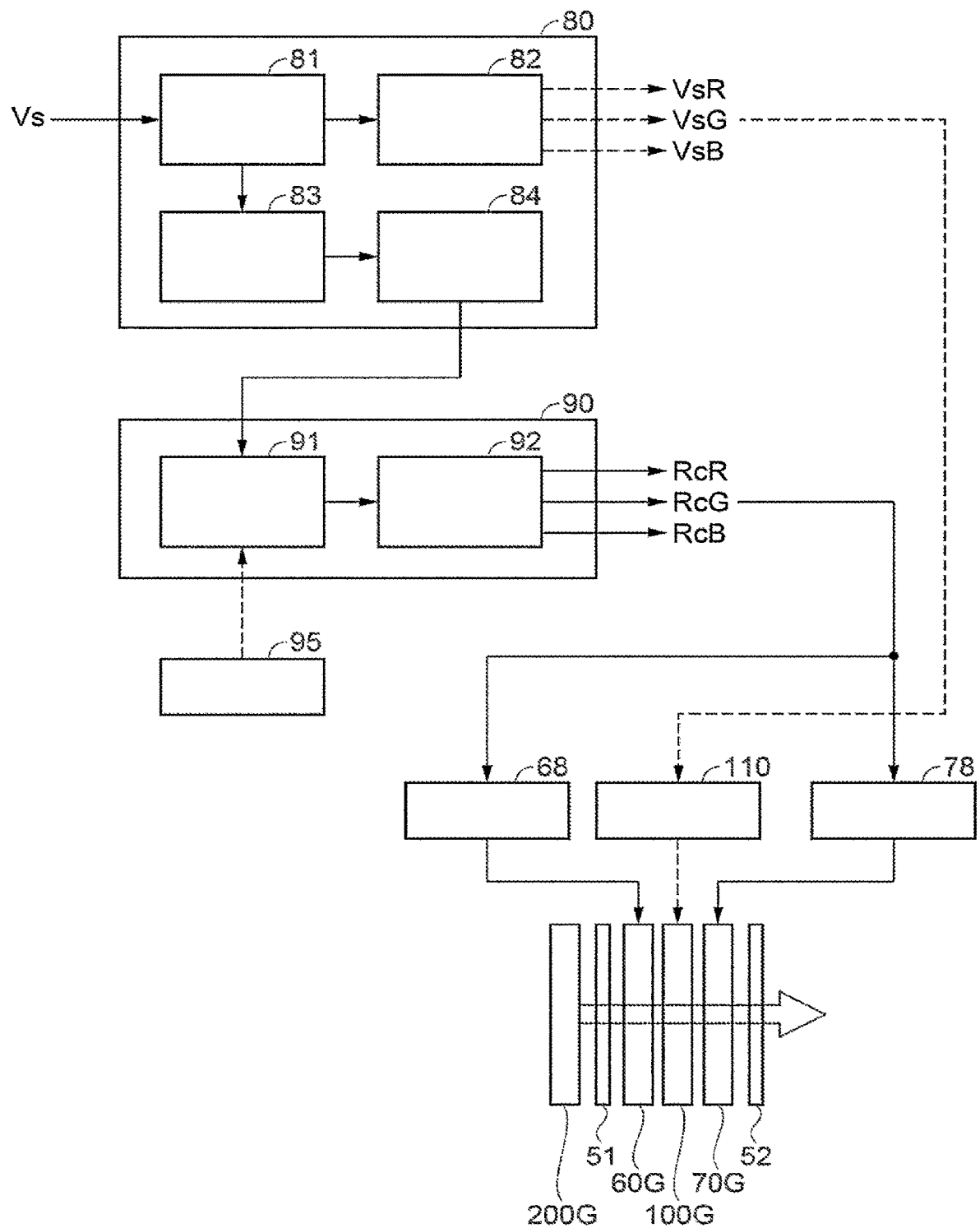
FIG. 8 is a functional block diagram illustrating a configuration relating to phase difference control.

FIG. 8 is a functional block diagram illustrating a configuration relating to phase difference control.

The image processing unit 80 includes a frame memory 81, an image signal output unit 82, a histogram generating unit 83, and an arithmetic unit 84. The frame memory 81 stores image data for one frame, based on an image signal Vs to be input. Based on the image signal Vs to be input, the image signal output unit 82 outputs a red image signal VsR to the liquid crystal panel 100R, outputs a green image signal VsG to the liquid crystal panel 100G, and outputs a blue image signal VsB to the liquid crystal panel 100B.

The histogram generating unit 83 generates a luminance histogram, based on the image data for one frame, which is stored in the frame memory 81. Based on the generated luminance histogram, the arithmetic unit 84 performs an arithmetic operation for obtaining average luminance of a display screen for one frame, and outputs average luminance information K. Note that, based on the generated luminance histogram, the arithmetic unit 84 may perform an arithmetic operation for obtaining a contrast of a display screen for one frame, which is as described later, and output the contrast.

The phase difference adjusting unit 90 includes a phase difference determining unit 91 and a phase difference control signal output unit 92.

Based on the average luminance information K of the display screen for one frame, which is output from the arithmetic unit 84 of the image processing unit 80, the phase difference determining unit 91 determines phase differences of the first phase difference controlling elements 60 and the second phase difference controlling elements 70. The phase difference adjusting unit 90 includes a table in which the average tone information K and the phase differences are associated with each other, and the phase differences are determined based on the table.

Based on the phase differences determined by the phase difference determining unit 91, the phase difference control signal output unit 92 outputs the phase difference control signals RcR, RcG, and RcB for controlling the phase differences of the first phase difference controlling elements 60 and the second phase difference controlling elements 70 of the liquid crystal devices 1R, 1G, and 1B.

In the liquid crystal device 1G, the phase difference control signals RcR, RcG, and RcB are input to a first phase difference controlling element driving unit 68 and a second phase difference controlling element driving unit 78 being control units. Note that a configuration further including the image processing unit 80 and the histogram generating unit 83 may be regarded as the control unit. A configuration further including the brightness detecting unit 95 may be regarded as the control unit.

The first phase difference controlling element driving unit 68 controls the phase difference of the first phase difference controlling element 60G, based on the phase difference control signal RcG. The first phase difference controlling element driving unit 68 controls a voltage to be applied to the electrodes 63 and 64 so that the phase difference of the liquid crystal layer 67 is equal to the phase difference determined by the phase difference determining unit 91.

The second phase difference controlling element driving unit 78 controls the phase difference of the second phase difference controlling element 70G, based on the phase difference control signal RcG. The second phase difference controlling element driving unit 78 controls a voltage to be applied to the electrodes 73 and 74 so that the phase difference of the liquid crystal layer 77 is equal to the phase difference determined by the phase difference determining unit 91.

Note that the first phase difference controlling element driving units 68 and the second phase difference controlling element driving units 78 of the liquid crystal device 1R and the liquid crystal device 1B are also configured similarly to the liquid crystal device 1G. Further, the phase difference control signals RcG to be input to the first phase difference controlling element driving unit 68 and the second phase difference controlling element driving unit 78 are not required to be the same signal, and may be adjusted to different signals in accordance with individual differences, for example.

A panel driving unit 110 drives the liquid crystal panel 100G, based on the green image signal VsG. Note that the liquid crystal devices 1R and 1B are configured similarly to the liquid crystal device 1G.

The phase difference determining unit 91 may determine the phase difference, based on the brightness information from the brightness detecting unit 95. For example, in a case in which the screen 500 is installed in a bright location, even when a display failure due to a reverse tilt domain is caused, the display failure is inconspicuous. Thus, only the first mode is selected regardless of the average luminance information.

The image processing unit 80, the phase difference adjusting unit 90, the first phase difference controlling element driving unit 68, the second phase difference controlling element driving unit 78, and the panel driving unit 110 may be mounted on an integrated circuit on one chip, or may be divided into a plurality of chips. The image processing unit 80, the phase difference adjusting unit 90, the first phase difference controlling element driving unit 68, the second phase difference controlling element driving unit 78, and the panel driving unit 110 may be mounted on a System on a Chip (SOC) of the projection-type display device 1000 being a display device or on a driving Integrated Circuit (IC) that drives the liquid crystal panel 100. Some of the functional blocks, for example, the image processing unit 80 and the phase difference adjusting unit 90 may be mounted on the SOC, and the first phase difference controlling element driving unit 68, the second phase difference controlling element driving unit 78, and the panel driving unit 110 may be mounted on the driving IC. These functional blocks may be formed at the substrate of the liquid crystal panel 100.

Figure 9:
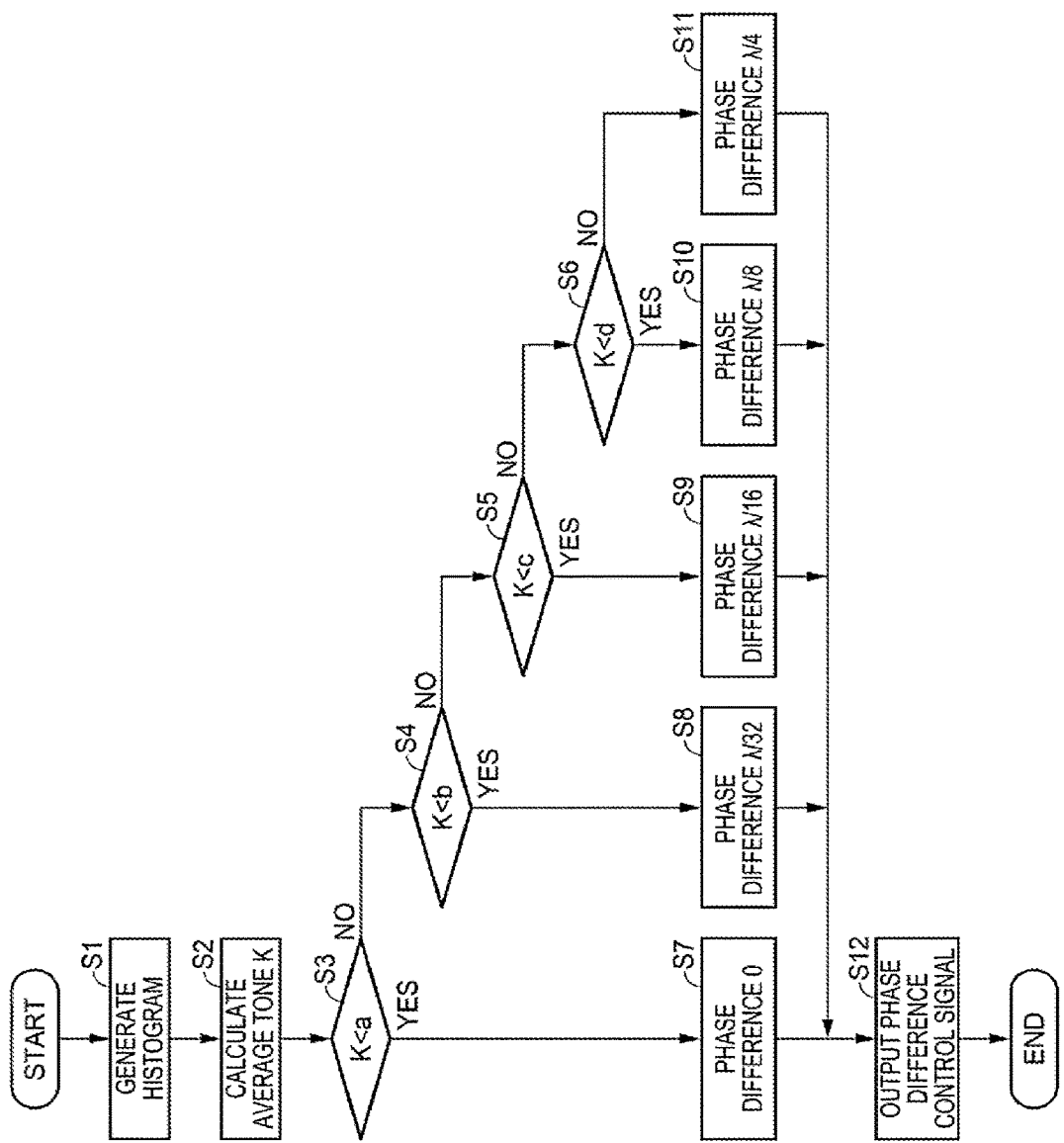
FIG. 9 is a flowchart for obtaining phase differences of the phase difference adjusting elements, based on brightness.

FIG. 9 is a flowchart for obtaining phase differences of the phase difference controlling elements, based on brightness.

In Step S1, the histogram generating unit 83 generates a histogram of a tone Pn of each pixel, based on image data for one screen, which is stored in the frame memory 81.

Figure 10A:
FIG. 10A is an explanatory diagram illustrating a dark display screen example.
Figure 10B:
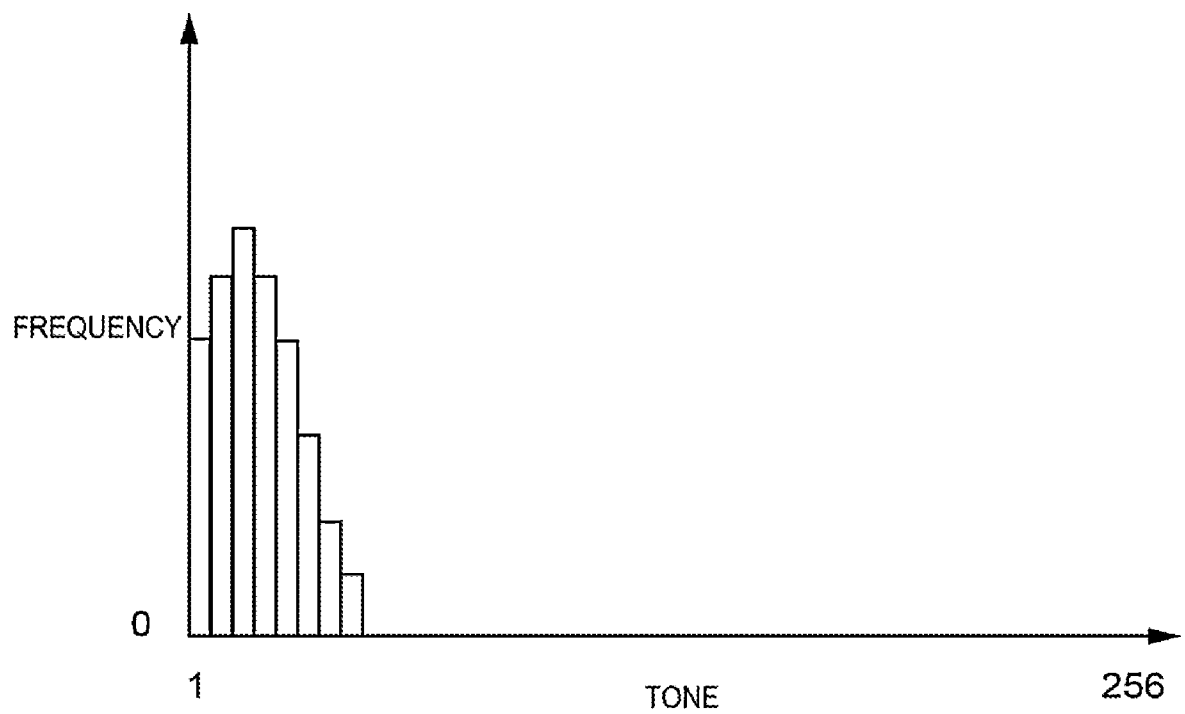
FIG. 10B is a luminance histogram of the dark display screen.

FIG. 10A is an explanatory diagram illustrating a dark display screen example, and illustrates a screen example in which black circles are displayed on a dark gray background. FIG. 10B is a luminance histogram of the dark display screen of FIG. 10A, and indicates the tone Pn on the horizontal axis and the frequency on the vertical axis.

When a dark screen is displayed as a whole as illustrated in FIG. 10A, the luminance histogram generated from the tone Pn of each pixel for one screen is a histogram having a high frequency on the low-tone side, as illustrated in FIG. 10B. In the case of the dark screen as described above, a horizontal electric field between adjacent pixels is not likely to be increased, and generation of a reverse tilt domain is rare. Even when a reverse tilt domain is generated, a display failure due to the reverse tilt domain is less likely to be visually recognized by a viewer.

Thus, in the present exemplary embodiment, when a dark screen is displayed, as described later, the first phase difference controlling element 60 and the second phase difference controlling element 70 are controlled in the first mode in which the phase differences are set to be zero.

Figure 11A:
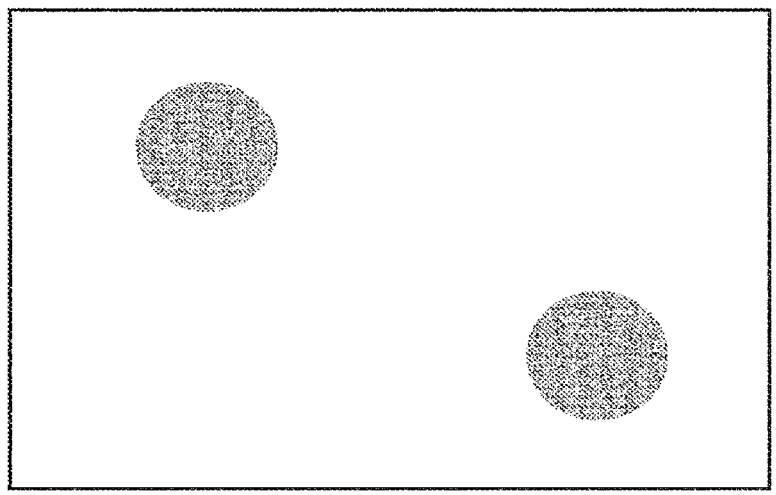
FIG. 11A is an explanatory diagram illustrating a bright display screen example.
Figure 11B:
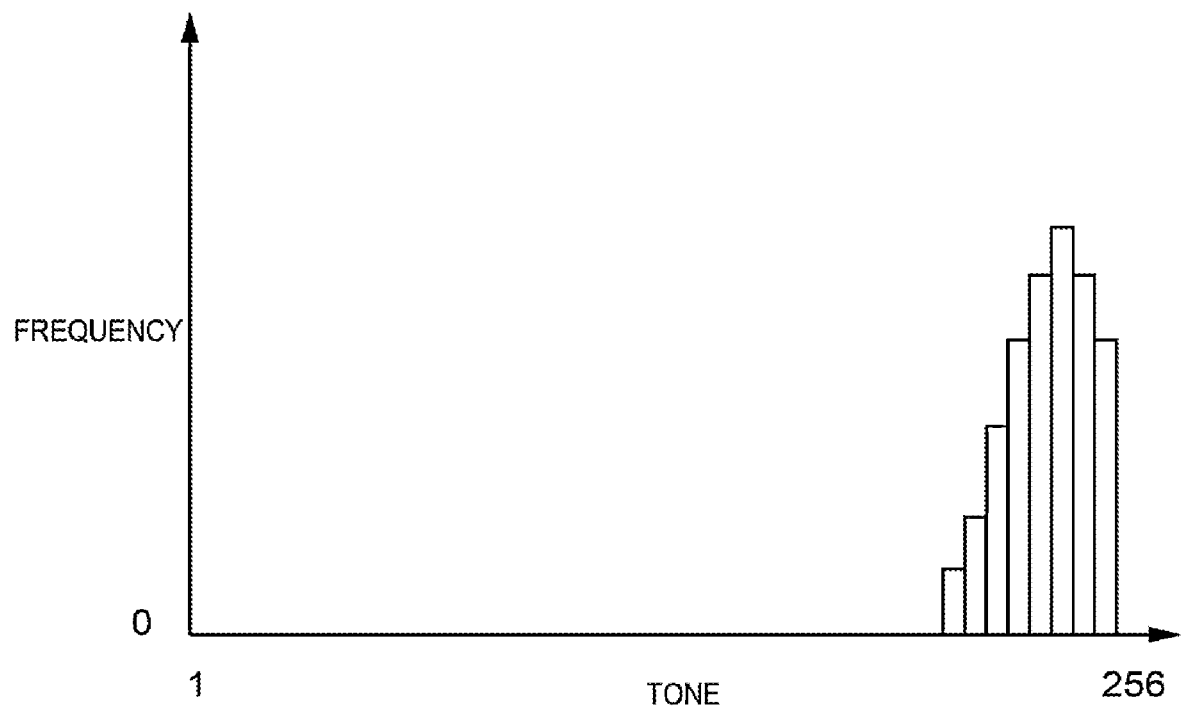
FIG. 11B is a luminance histogram of the bright display screen.

FIG. 11A is an explanatory diagram illustrating a bright display screen example, and illustrates a screen example in which pale gray circles are displayed on a bright white background. FIG. 11B is a luminance histogram of the bright display screen of FIG. 11A, and indicates the tone Pn on the horizontal axis and the frequency on the vertical axis, similarly to FIG. 10B.

In a case of a bright screen as a whole as illustrated in FIG. 11A, the luminance histogram generated from the tone Pn of each pixel for one screen is a histogram having a high frequency on the high-tone side, as illustrated in FIG. 11B. In the case of the bright screen as described above, a horizontal electric field between adjacent pixels is likely to be increased, and a reverse tilt domain is also likely to be generated. A display failure caused by a reverse tilt domain is visually recognized easily by a viewer.

Thus, in the present exemplary embodiment, when a bright screen is displayed, as described later, the first phase difference controlling element 60 and the second phase difference controlling element 70 are controlled in the second mode in which the phase differences are set to be $\lambda/8$, $\lambda/4$, or the like.

In the flowchart of FIG. 9, in Step S2, the arithmetic unit 84 calculates the average tone information K for one screen, based on the generated histogram.

In Step S3, Step S4, Step S5, and Step S6, the phase difference determining unit 91 determines the phase differences of the first phase difference controlling element 60 and the second phase difference controlling element 70. In Step S3, Step S4, Step S5, and Step S6, a is 50, b is 100, c is 150, and d is 200. Note that the values of a, b, c, and d are merely examples and may be changed as appropriate.

The phase difference determining unit 91 determines the phase differences, based on the table in which the average tone information K and the phase differences are associated with each other.

In Step S7, when it is determined that the average tone information K is smaller than a in Step S3, the phase difference determining unit 91 sets the phase difference to be zero.

In Step S8, when it is determined that the average tone information K is equal to or greater than a and smaller than b in Step S4, the phase difference determining unit 91 sets the phase difference to be $\lambda/32$.

In Step S9, when it is determined that the average tone information K is equal to or greater than b and smaller than c in Step S5, the phase difference determining unit 91 sets the phase difference to be $\lambda/16$.

In Step S10, when it is determined that the average tone information K is equal to or greater than c and smaller than d in Step S6, the phase difference determining unit 91 sets the phase difference to be $\lambda/8$.

In Step S11, when it is determined that the average tone information K is equal to or greater than d in Step S6, the phase difference determining unit 91 sets the phase difference to be $\lambda/4$.

The phase difference determining unit 91 performs control so that, on the liquid crystal devices 1R, 1G, and 1B, the phase differences of the first phase difference controlling elements 60 and the second phase difference controlling elements 70 are equal to each other. The phase differences may be corrected in accordance with individual differences of the first phase difference controlling element 60 and the second phase difference controlling element 70.

In Step S12, based on the phase differences determined by the phase difference determining unit 91, the phase difference control signal output unit 92 outputs the phase difference control signals RcR, RcG, and RcB for controlling the phase differences of the first phase difference controlling elements 60 and the second phase difference controlling elements 70, to the first phase difference controlling elements 60 and the second phase difference controlling elements 70 of the liquid crystal devices 1R, 1G, and 1B.

The first phase difference controlling elements 60 and the second phase difference controlling elements 70 of the liquid crystal devices 1R, 1G, and 1B drive the liquid crystal layers 67 of the first phase difference controlling elements 60 and the liquid crystal layers 77 of the second phase difference controlling elements 70, based on the phase difference control signals RcR, RcG, and RcB, and change the alignment direction of the liquid crystal molecules of the liquid crystal layers 67 and the alignment direction of the liquid crystal molecules of the liquid crystal layers 77 to a desired direction between the vertical direction and the parallel direction with respect to the substrate surface. With this, the phase differences of the first phase difference controlling element 60 and the second phase difference controlling element 70 are controlled.

In Step S7, when the phase difference is set to be zero, the first phase difference controlling element 60 and the second phase difference controlling element 70 are in the linearly polarized light mode being the first mode. The phase difference of the first phase difference controlling element 60 and the phase difference of the second phase difference controlling element 70 are controlled so that the linearly polarized incident light is emitted as linearly polarized light without changing the polarization state.

In the case of the dark screen as in FIG. 10B, the first mode is selected, and display in which a contrast is prioritized is performed. In the case of the dark screen, a horizontal electric field between pixels is not likely to be increased, and generation of a reverse tilt domain is suppressed. Moreover, even when a reverse tilt domain is generated, an influence of an alignment failure is less likely to be visually recognized. Thus, the phase difference of the first phase difference controlling element 60 and the phase difference of the second phase difference controlling element 70 are controlled in the first mode, and hence display in which a contrast is prioritized can be performed, allowing display quality felt by a viewer to be improved.

From Step S8 to Step S11, the second mode is performed. In accordance with the phase difference, the first phase difference controlling element 60 changes the linearly polarized incident light to elliptically polarized light or circularly polarized light, and emits the resultant light. In accordance with the phase difference, the second phase difference controlling element 70 converts the elliptically polarized incident light or circularly polarized incident light to linearly polarized light, and emits the resultant light. Note that, when the phase difference is $\lambda/32$, $\lambda/16$, or $\lambda/8$, the first phase difference controlling element 60 emits the elliptically polarized light. When the phase difference is $\lambda/4$, the circularly polarized light is emitted.

In the case of the bright screen as in FIG. 11B, a horizontal electric field between pixels is likely to be increased, and a reverse tilt domain is likely to be generated. Further, an influence of an alignment failure is likely to be visually recognized. Thus, the phase difference of the first phase difference controlling element 60 and the phase difference of the second phase difference controlling element 70 are controlled in the second mode, and hence display in which improvement of an alignment failure is prioritized can be performed, allowing display quality felt by a viewer to be improved.

As described above, according to the liquid crystal device 1 of the present exemplary embodiment, the following effects can be exerted.

The liquid crystal device 1 includes the liquid crystal panel 100 including the liquid crystal layer 5 as the first liquid crystal layer, the first polarizing plate 51 provided on the light incidence side of the liquid crystal panel 100, the second polarizing plate 52 provided on the light emission side of the liquid crystal panel 100, the first phase difference controlling element 60 arranged between the first polarizing plate 51 and the liquid crystal panel 100 and including the liquid crystal layer 67 as the second liquid crystal layer, the second phase difference controlling element 70 arranged between the liquid crystal panel 100 and the second polarizing plate 52 and including the liquid crystal layer 77 as the third liquid crystal layer, and the first phase difference controlling element driving unit 68 and the second phase difference controlling element driving unit 78 as the control units configured to control a value of a voltage applied to the first phase difference controlling element 60 and the second phase difference controlling element 70, based on image data input to the liquid crystal panel 100. Note that the first polarizing element may be the laser light source 200 that emits linearly polarized light.

With this configuration, the polarization state of the light entering the liquid crystal panel 100 can be controlled based on an image displayed on the liquid crystal device 1. Thus, display quality as viewed by a viewer can be improved.

In the liquid crystal device 1 of the present exemplary embodiment, the control unit includes the image processing unit 80 and the phase difference adjusting unit 90, and controls the first phase difference of the first phase difference controlling element 60 and the second phase difference of the second phase difference controlling element 70, based on brightness information of an image displayed by the liquid crystal panel 100.

With this configuration, the polarization state of the light entering the liquid crystal panel 100 can be controlled based on brightness information of an image displayed on the liquid crystal device 1. Thus, display quality as viewed by a viewer can be improved.

In the liquid crystal device 1 of the present exemplary embodiment, the control unit includes the brightness detection unit 95, and controls the first phase difference of the first phase difference controlling element 60 and the second phase difference of the second phase difference controlling element 70, based on brightness information of the periphery of the projection surface 510 being a display surface of the screen 500.

With this configuration, the polarization state of the light entering the liquid crystal panel 100 can be controlled based on the brightness information of the periphery of the projection surface 510 of the screen 500. Thus, display quality as viewed by a viewer can be improved.

In the liquid crystal device 1 of the present exemplary embodiment, when a wavelength of incident light on the liquid crystal panel 100 is λ, the control unit controls each of the first phase difference of the first phase difference controlling element 60 and the second phase difference of the second phase difference controlling element 70 to a phase difference of from 0 to λ/4.

With this configuration, the polarization state of the light entering the liquid crystal panel 100 can be controlled from linearly polarized light to elliptically polarized light or circularly polarized light. Thus, display quality as viewed by a viewer can be improved.

In the liquid crystal device 1 of the present exemplary embodiment, the control unit has the first mode and the second mode. In the first mode, the control unit controls the first phase difference and the second phase difference so that the first phase difference controlling element 60 emits linearly polarized light and the second phase difference controlling element 70 emits linearly polarized light. In the second mode, the control unit controls the first phase difference and the second phase difference so that the first phase difference controlling element 60 emits elliptically polarized light or circularly polarized light and the second phase difference controlling element 70 emits linearly polarized light.

With this configuration, the polarization state of the light entering the liquid crystal panel 100 can be controlled from linearly polarized light to elliptically polarized light or circularly polarized light. Thus, display quality as viewed by a viewer can be improved.

In the liquid crystal device 1 of the present exemplary embodiment, the first phase difference controlling element 60 includes the liquid crystal layer 67 as the second liquid crystal layer and the pair of electrodes 63 and 64 for applying the first voltage to the liquid crystal layer 67. The second phase difference controlling element 70 includes the liquid crystal layer 77 as the third liquid crystal layer and the pair of electrodes 73 and 74 for applying the second voltage to the liquid crystal layer 77. The control unit controls the first voltage and the second voltage.

With this configuration, when a voltage applied to the liquid crystal layer 67 of the first phase difference controlling element 60 and the liquid crystal layer 77 of the second phase difference controlling element 70 is controlled, the polarization state of the light entering the liquid crystal panel 100 can be controlled from linearly polarized light to elliptically polarized light or circularly polarized light. Thus, display quality as viewed by a viewer can be improved.

The liquid crystal device 1 includes the polarizing plate 51 as the first polarizing element, the second polarizing late 52 as the second polarizing element, the liquid crystal panel 100 arranged between the first polarizing plate 51 and the second polarizing late 52, the first phase difference controlling element 60 arranged between the first polarizing plate 51 and the liquid crystal panel 100 and including the liquid crystal layer 67 as the second liquid crystal layer, the first phase difference controlling element 60 being capable of changing the alignment direction of the liquid crystal molecules of the liquid crystal layer 67, based on the first signal, and the second phase difference controlling element 70 arranged between the liquid crystal panel 100 and the second polarizing late 52 and including the liquid crystal layer 77 as the third liquid crystal layer, the second phase difference controlling element 70 being capable of changing the alignment direction of the liquid crystal molecules of the liquid crystal layer 77, based on the second signal.

With this configuration, the alignment direction of the liquid crystal molecules of the liquid crystal layer 67 of the first phase difference controlling element 60 can be changed based on the first signal, and the alignment direction of the liquid crystal molecules of the liquid crystal layer 77 of the second phase difference controlling element 70 can be changed based on the second signal. Thus, display quality as viewed by a viewer can be improved.

The liquid crystal device 1 includes the first phase difference controlling element 60 and the second phase difference controlling element 70. The first phase difference controlling element 60 is arranged between the first polarizing plate 51 as the first polarizing element and the liquid crystal panel 100 including the liquid crystal layer 5 as the first liquid crystal layer, includes the liquid crystal layer 67 as the second liquid crystal layer, and is capable of changing the alignment direction of the liquid crystal molecules of the liquid crystal layer 67, based on the first signal. The second phase difference controlling element 70 is arranged between the liquid crystal panel 100 and the second polarizing late 52 as the second polarizing element, includes the liquid crystal layer 77 as the third liquid crystal layer, and is capable of changing the alignment direction of the liquid crystal molecules of the liquid crystal layer 77, based on the second signal.

With this configuration, the alignment direction of the liquid crystal molecules of the liquid crystal layer 67 of the first phase difference controlling element 60 can be changed based on the first signal, and the alignment direction of the liquid crystal molecules of the liquid crystal layer 77 of the second phase difference controlling element 70 can be changed based on the second signal. Thus, display quality as viewed by a viewer can be improved.

The liquid crystal device 1 includes the first phase difference controlling element 60 and the second phase difference controlling element 70. The first phase difference controlling element 60 is arranged between the first polarizing plate 51 as the first polarizing element and the liquid crystal panel 100 including the liquid crystal layer 5 as the first liquid crystal layer, and includes the liquid crystal layer 67 as the second liquid crystal layer on which linearly polarized light is incident and the first phase difference controlling element driving unit 68 as the first driving unit that controls the phase difference of the liquid crystal layer 67 so as to emit linearly polarized light or circularly polarized light from the liquid crystal layer 67. The second phase difference controlling element 70 is arranged between the liquid crystal panel 100 and the second polarizing late 52 as the second polarizing element, and includes the liquid crystal layer 77 as the third liquid crystal layer on which linearly polarized light or circularly polarized light is incident and the second phase difference controlling element driving unit 78 as the second driving unit that controls the phase difference of the liquid crystal layer 77 so as to emit linearly polarized light from the liquid crystal layer 77.

With this configuration, the phase difference of the liquid crystal layer 67 of the first phase difference controlling element 60 can be controlled to emit linearly polarized light or circularly polarized light from the liquid crystal layer 67, and the phase difference of the liquid crystal layer 77 of the second phase difference controlling element 70 can be controlled to emit linearly polarized light from the liquid crystal layer 77. Thus, display quality as viewed by a viewer can be improved.

The projection-type display device 1000 as the display device includes the liquid crystal device 1 described above.

With this configuration, the projection-type display device 1000 including the liquid crystal device 1 enables improvement of display quality as viewed by a viewer while suppressing a display failure caused by a reverse tilt domain. Note that other electronic devices may be adopted as the display device.

The optical modulation module 4 includes the liquid crystal panel 100 including the liquid crystal layer 5 as the first liquid crystal layer, the first polarizing plate 51 provided on the light incidence side of the liquid crystal panel 100, the second polarizing plate 52 provided on the light emission side of the liquid crystal panel 100, the first phase difference controlling element 60, and the second phase difference controlling element 70. The first phase difference controlling element 60 to which a voltage is applied in accordance with an image displayed on the liquid crystal panel 100 is arranged between the first polarizing plate 51 and the liquid crystal panel 100, and includes the liquid crystal layer 67 as the second liquid crystal layer. The second phase difference controlling element 70 to which a voltage is applied in accordance with an image displayed on the liquid crystal panel 100 is arranged between the liquid crystal panel 100 and the second polarizing plate 52, and includes the liquid crystal layer 77 as the third liquid crystal layer.

With this configuration, the polarization state of the light entering the liquid crystal panel 100 can be controlled based on an image displayed on the liquid crystal panel 100. Thus, display quality as viewed by a viewer can be improved.

In the control method of the liquid crystal device 1, the liquid crystal device 1 including the liquid crystal panel 100 including the liquid crystal layer 5 as the first liquid crystal layer, the first polarizing plate 51 provided on the light incidence side of the liquid crystal panel 100, the second polarizing plate 52 provided on the light emission side of the liquid crystal panel 100, the first phase difference controlling element 60 arranged between the first polarizing plate 51 and the liquid crystal panel 100 and including the liquid crystal layer 67 as the second liquid crystal layer, the second phase difference controlling element 70 arranged between the liquid crystal panel 100 and the second polarizing plate 52 and including the liquid crystal layer 77 as the third liquid crystal layer, and the first phase difference controlling element driving unit 68 and the second phase difference controlling element driving unit 78 as the control units configured to control a value of a voltage applied to the first phase difference controlling element 60 and the second phase difference controlling element 70, based on image data input to the liquid crystal panel 100, the first phase difference controlling element driving unit 68 and the second phase difference controlling element driving unit 78 control the first phase difference and the second phase difference, based on the average luminance K as the brightness information or the contrast CR as the contrast information of the image displayed by the liquid crystal panel 100.

With this configuration, the polarization state of the light entering the liquid crystal panel 100 can be controlled based on an image displayed on the liquid crystal device 1. Thus, display quality as viewed by a viewer can be improved.

2. Second Exemplary Embodiment 2.1. Outline of Phase Difference Control

Figure 12:
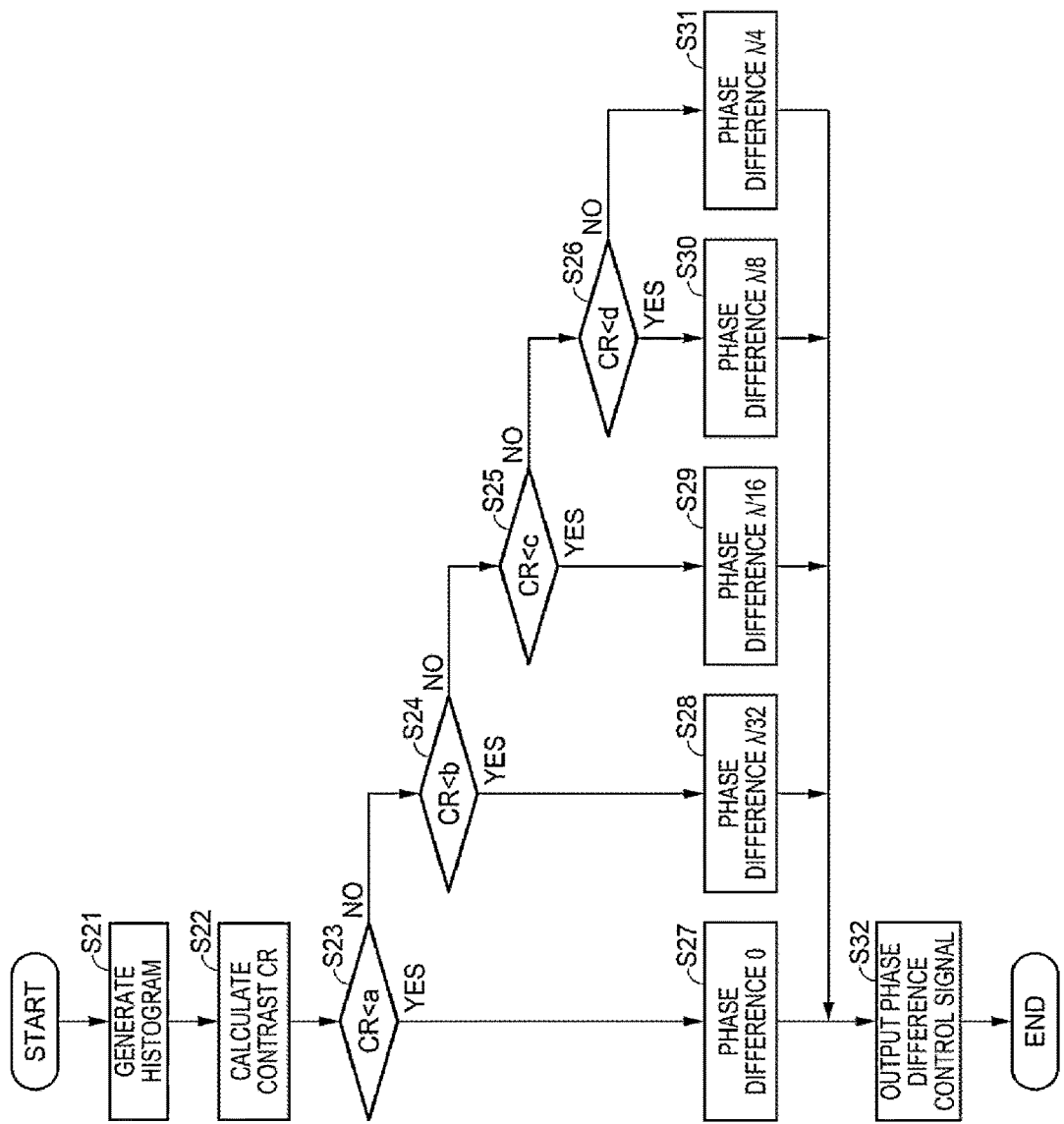
FIG. 12 is a flowchart for obtaining phase differences of the phase difference adjusting elements, based on a contrast.

FIG. 12 is a flowchart for obtaining phase differences of the phase difference controlling elements, based on a contrast.

In Step S21, the histogram generating unit 83 generates a histogram of the tone Pn of each pixel, based on image data for one screen, which is stored in the frame memory 81.

Figure 13A:
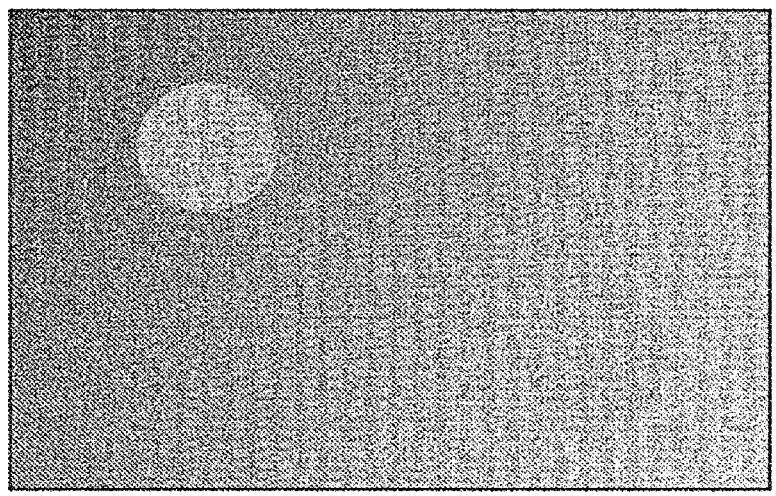
FIG. 13A is an explanatory diagram illustrating a low-contrast display screen example.
Figure 13B:
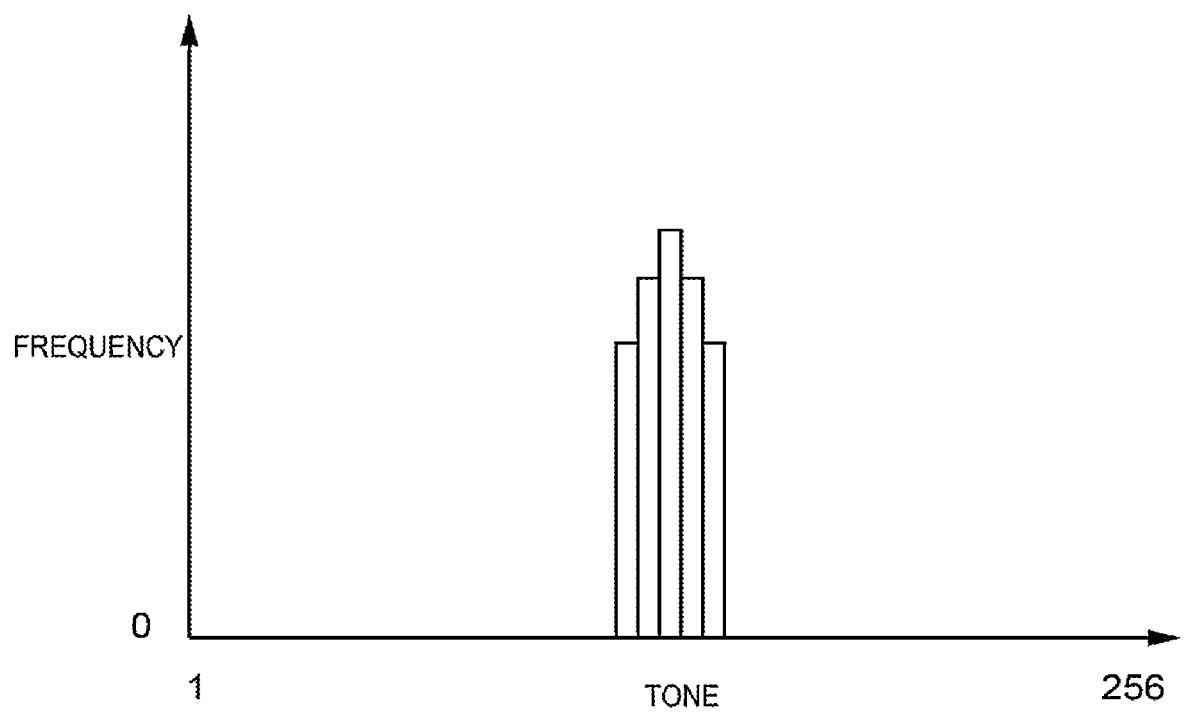
FIG. 13B is a luminance histogram of the low-contrast display screen.

FIG. 13A is an explanatory diagram illustrating a low-contrast display screen example, and illustrates a screen example with a small difference in brightness on the screen as a whole. FIG. 13B is a luminance histogram of the low-contrast display screen of FIG. 13A, and indicates the tone Pn on the horizontal axis and the frequency on the vertical axis.

When the screen with a small difference in brightness on the screen as a whole as illustrated in FIG. 13A is displayed, the luminance histogram generated from the tone Pn of each pixel for one screen is a histogram having one large convex shape as illustrated in FIG. 13B. In a case of the low-contrast screen as described above, a horizontal electric field between adjacent pixels is not likely to be increased, and generation of a reverse tilt domain is rare. Even when a reverse tilt domain is generated, a display failure due to the reverse tilt domain is less likely to be visually recognized by a viewer.

Thus, in the present exemplary embodiment, when a dark screen is displayed, as described later, the first phase difference controlling element 60 and the second phase difference controlling element 70 are controlled in the first mode in which the phase differences are set to be zero.

Figure 14A:
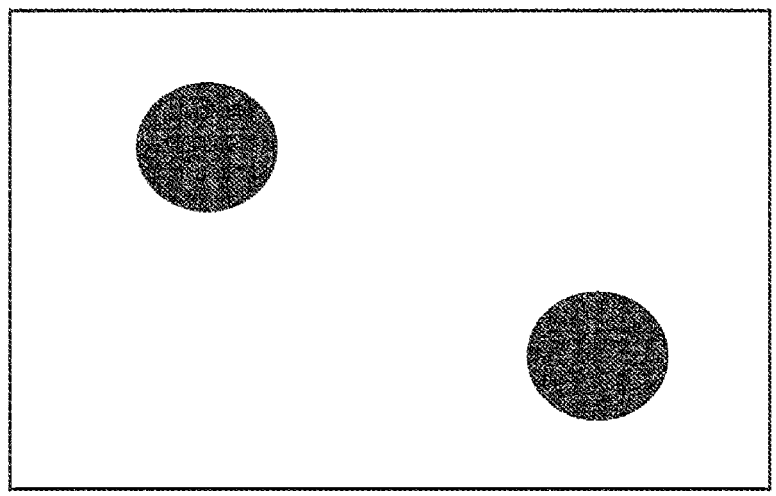
FIG. 14A is an explanatory diagram illustrating a high-contrast display screen example.
Figure 14B:
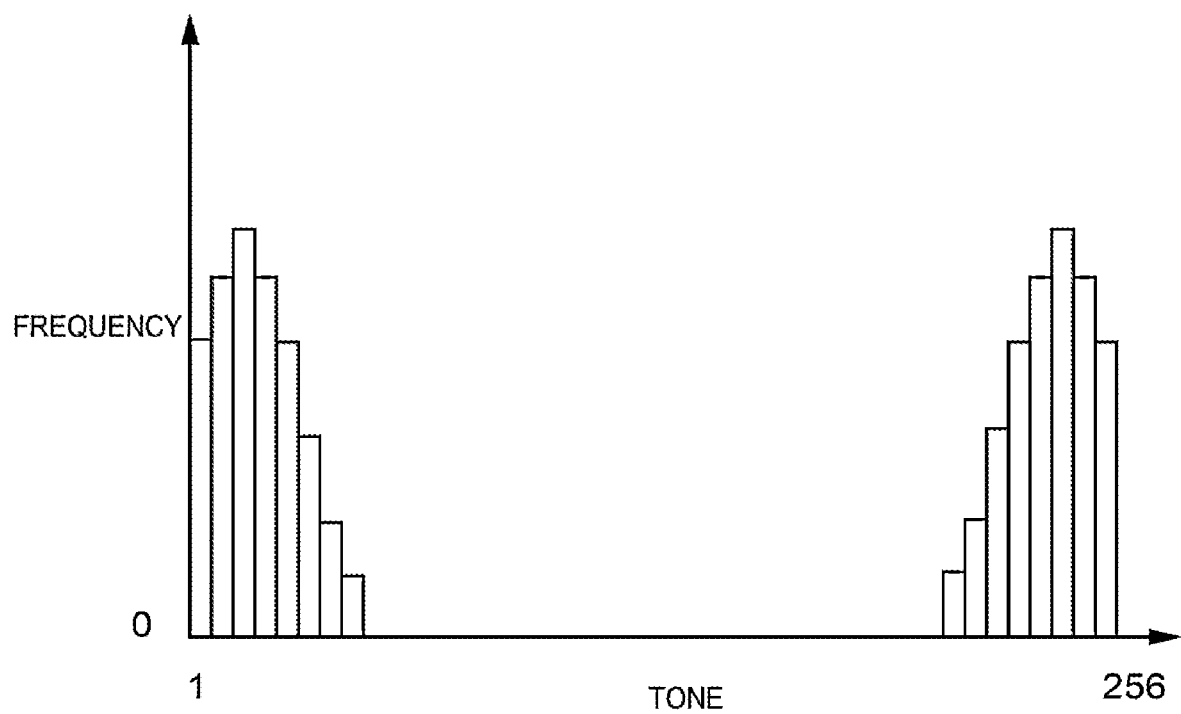
FIG. 14B is a luminance histogram of the high-contrast display screen.

FIG. 14A is an explanatory diagram illustrating a high-contrast display screen example, and illustrates a screen example with a large difference in brightness including black and white. FIG. 14B is a luminance histogram of the high-contrast display screen of FIG. 14A, and indicates the tone Pn on the horizontal axis and the frequency on the vertical axis, similarly to FIG. 13B.

When a highly bright screen is displayed as illustrated in FIG. 14A, the luminance histogram generated from the tone Pn of each pixel for one screen is a histogram having large convex shapes at two positions away from each other as illustrated in FIG. 14B. In a case of the high-contrast screen as described above, a horizontal electric field between adjacent pixels is likely to be increased, and a reverse tilt domain is also likely to be generated. A display failure caused by a reverse tilt domain is visually recognized easily by a viewer.

Thus, in the present exemplary embodiment, when a high-contrast screen is displayed, as described later, the first phase difference controlling element 60 and the second phase difference controlling element 70 are controlled in the second mode in which the phase differences are set to be $\lambda/8$, $\lambda/4$, or the like.

In the flowchart of FIG. 12, in Step S22, the arithmetic unit 84 calculates the contrast CR for one screen, based on the generated histogram. For example, the contrast CR is calculated from a tone difference between two tones with high frequencies. Note that, when there are three or more tones with high frequencies, the contrast CR may be obtained from two tone differences with greater tone differences.

In Step S23, Step S24, Step S25, and Step S26, the phase difference determining unit 91 determines the phase differences of the first phase difference controlling element 60 and the second phase difference controlling element 70. In Step S23, Step S24, Step S25, and Step S26, a is 500, b is 1000, c is 1500, and d is 2000. Note that the values of a, b, c, and d are merely examples and may be changed as appropriate.

The phase difference determining unit 91 determines the phase differences, based on the table in which the contrast CR and the phase differences are associated with each other.

In Step S27, when it is determined that the contrast CR is smaller than a in Step S23, the phase difference determining unit 91 sets the phase difference to be zero.

In Step S28, when it is determined that the contrast CR is equal to or greater than a and smaller than b in Step S24, the phase difference determining unit 91 sets the phase difference to be $\lambda/32$.

In Step S29, when it is determined that the contrast CR is equal to or greater than b and smaller than c in Step S25, the phase difference determining unit 91 sets the phase difference to be $\lambda/16$.

In Step S30, when it is determined that the contrast CR is equal to or greater than c and smaller than d in Step S26, the phase difference determining unit 91 sets the phase difference to be $\lambda/8$.

In Step S31, when it is determined that the contrast CR is equal to or greater than d in Step S26, the phase difference determining unit 91 sets the phase difference to be $\lambda/4$.

The phase difference determining unit 91 performs control so that, on the liquid crystal devices 1R, 1G, and 1B, the phase differences of the first phase difference controlling elements 60 and the second phase difference controlling elements 70 are equal to each other. The phase differences may be corrected in accordance with individual differences of the first phase difference controlling element 60 and the second phase difference controlling element 70.

In Step S22, based on the phase differences determined by the phase difference determining unit 91, the phase difference control signal output unit 92 outputs the phase difference control signals RcR, RcG, and RcB for controlling the phase differences of the first phase difference controlling elements 60 and the second phase difference controlling elements 70, to the first phase difference controlling elements 60 and the second phase difference controlling elements 70 of the liquid crystal devices 1R, 1G, and 1B.

Based on the phase difference control signals RcR, RcG, and RcB, the first phase difference controlling elements 60 and the second phase difference controlling elements 70 of the liquid crystal devices 1R, 1G, and 1B apply voltages for driving the liquid crystal layers 67 of the first phase difference controlling elements 60 and the liquid crystal layers 77 of the second phase difference controlling elements 70, to the electrodes 63 and 64 of the first phase difference controlling elements 60 and the electrodes 73 and 74 of the second phase difference controlling elements 70, and control the first phase difference controlling elements 60 and the second phase difference controlling elements 70.

In Step S27, when the phase difference is set to be zero, the first phase difference controlling elements 60 and the second phase difference controlling elements 70 are in the linearly polarized light mode being the first mode, and the phase difference is controlled so that the linearly polarized incident light is emitted as linearly polarized light without changing the polarization state.

In a case of the low-contrast screen as in FIG. 13B, the first mode is selected, and display in which a contrast is prioritized is performed. In the case of the low-contrast screen, a horizontal electric field between pixels is not likely to be increased, and generation of a reverse tilt domain is suppressed. Moreover, even when a reverse tilt domain is generated, an influence of an alignment failure is less likely to be visually recognized by a viewer. Thus, when display in which a contrast is prioritized is performed as the first mode, display quality viewed and felt by a viewer can be improved.

From Step S28 to Step S31, the second mode is performed. In accordance with the phase difference, the first phase difference controlling element 60 changes the linearly polarized incident light to elliptically polarized light or circularly polarized light, and emits the resultant light. In accordance with the phase difference, the second phase difference controlling element 70 converts the elliptically polarized incident light or circularly polarized incident light to linearly polarized light, and emits the resultant light. Note that, when the phase difference is $\lambda/32$, $\lambda/16$, or $\lambda/8$, the second phase difference controlling element 70 converts the elliptically polarized incident light to linearly polarized light, and emits the resultant light. When the phase difference is $\lambda/4$, the second phase difference controlling element 70 converts the circularly polarized incident light to linearly polarized light, and emits the resultant light. When the phase difference is zero, the second phase difference controlling element 70 emits the linearly polarized incident light as linearly polarized light without conversion.

In a case of the high-contrast screen as in FIG. 14B, a horizontal electric field between pixels is likely to be increased, and a reverse tilt domain is likely to be generated. Further, an influence of an alignment failure is likely to be visually recognized. Thus, display in which improvement of an alignment failure is prioritized is performed as the second mode, and hence display quality viewed and felt by a viewer can be improved.

As described above, according to the liquid crystal device 1 of the present exemplary embodiment, the following effects can be exerted.

In the liquid crystal device 1 of the present exemplary embodiment, the control unit includes the image processing unit 80 and the phase difference adjusting unit 90, and controls the first phase difference of the first phase difference controlling element 60 and the second phase difference of the second phase difference controlling element 70 based on contrast information of an image displayed by the liquid crystal panel 100.

With this configuration, the polarization state of the light entering the liquid crystal panel 100 can be controlled based on the contrast information of the image displayed on the liquid crystal device 1. Thus, display quality as viewed by a viewer can be improved.

What is claimed is:
1. A liquid crystal device comprising:
a liquid crystal panel including a first liquid crystal layer;
a first polarizing element provided on a light incidence side of the liquid crystal panel;
a second polarizing element provided on a light emission side of the liquid crystal panel;
a first phase difference adjusting element arranged between the first polarizing element and the liquid crystal panel and including a second liquid crystal layer;

a second phase difference adjusting element arranged between the liquid crystal panel and the second polarizing element and including a third liquid crystal layer; and a control unit configured to control a voltage applied to the second liquid crystal layer and the third liquid crystal layer in accordance with an image displayed by the liquid crystal panel, wherein the control unit controls the voltage applied to the second liquid crystal layer and the third liquid crystal layer, based on brightness information of the image displayed by the liquid crystal panel, and when a wavelength of incident light on the liquid crystal panel is λ, the control unit controls each of a voltage applied to the second liquid crystal layer and a voltage applied to the third liquid crystal layer so that each of a first phase difference applied to incident light by the second liquid crystal layer and a second phase difference applied to incident light by the third liquid crystal layer is a phase difference of from 0 to λ/4.

2. The liquid crystal device according to claim 1, wherein the control unit controls the voltage applied to the second liquid crystal layer and the third liquid crystal layer, based on contrast information of the image displayed by the liquid crystal panel.

3. The liquid crystal device according to claim 1, wherein the control unit controls the voltage applied to the second liquid crystal layer and the third liquid crystal layer, based on brightness information of a periphery of a display screen on which the image is displayed.

4. The liquid crystal device according to claim 1, wherein the control unit has a first mode and a second mode, the first mode being a mode in which the control unit controls the voltage applied to the second liquid crystal layer and the third liquid crystal layer so that the first phase difference adjusting element emits linearly polarized light and the second phase difference adjusting element emits linearly polarized light, and the second mode being a mode in which the control unit controls the voltage applied to the second liquid crystal layer and the third liquid crystal layer so that the first phase difference adjusting element emits elliptically polarized light or circularly polarized light and the second phase difference adjusting element emits linearly polarized light.

5. The liquid crystal device according to claim 1, wherein the first phase difference adjusting element includes a first electrode and a second electrode configured to apply a first voltage to the second liquid crystal layer, the second phase difference adjusting element includes a third electrode and a fourth electrode configured to apply a second voltage to the third liquid crystal layer, and the control unit controls the first voltage and the second voltage.

6. A display device comprising the liquid crystal device according to claim 1.

7. A control method of a liquid crystal device, the liquid crystal device including:

a liquid crystal panel including a first liquid crystal layer, a first polarizing element provided on a light incidence side of the liquid crystal panel, a second polarizing element provided on a light emission side of the liquid crystal panel, a first phase difference adjusting element arranged between the first polarizing element and the liquid crystal panel and including a second liquid crystal layer, a second phase difference adjusting element arranged between the liquid crystal panel and the second polarizing element and including a third liquid crystal layer, and a control unit configured to control a value of a voltage applied to the second liquid crystal layer and the third liquid crystal layer, based on image data input to the liquid crystal panel, wherein the liquid crystal device controls the voltage applied to the second liquid crystal layer and the third liquid crystal layer, based on brightness information or contrast information of an image displayed by the liquid crystal panel, and the control unit has a first mode and a second mode, the first mode being a mode in which the control unit controls the voltage applied to the second liquid crystal layer and the third liquid crystal layer so that the first phase difference adjusting element emits linearly polarized light and the second phase difference adjusting element emits linearly polarized light, and the second mode being a mode in which the control unit controls the voltage applied to the second liquid crystal layer and the third liquid crystal layer so that the first phase difference adjusting element emits elliptically polarized light or circularly polarized light and the second phase difference adjusting element emits linearly polarized light.

8. A liquid crystal device comprising:

a liquid crystal panel including a first liquid crystal layer;

a first polarizing element provided on a light incidence side of the liquid crystal panel;

a second polarizing element provided on a light emission side of the liquid crystal panel;

a first phase difference adjusting element arranged between the first polarizing element and the liquid crystal panel and including a second liquid crystal layer;

a second phase difference adjusting element arranged between the liquid crystal panel and the second polarizing element and including a third liquid crystal layer; and a control unit configured to control a voltage applied to the second liquid crystal layer and the third liquid crystal layer in accordance with an image displayed by the liquid crystal panel, wherein the control unit controls the voltage applied to the second liquid crystal layer and the third liquid crystal layer, based on brightness information of the image displayed by the liquid crystal panel, and the control unit has a first mode and a second mode, the first mode being a mode in which the control unit controls the voltage applied to the second liquid crystal layer and the third liquid crystal layer so that the first phase difference adjusting element emits linearly polarized light and the second phase difference adjusting element emits linearly polarized light, and the second mode being a mode in which the control unit controls the voltage applied to the second liquid crystal layer and the third liquid crystal layer so that the first phase difference adjusting element emits elliptically polarized light or circularly polarized light and the second phase difference adjusting element emits linearly polarized light.

\* \* \* \* \*